United States Patent
Kim

(10) Patent No.: US 12,512,721 B2
(45) Date of Patent: Dec. 30, 2025

(54) MOTOR

(71) Applicant: LG INNOTEK CO., LTD., Seoul (KR)

(72) Inventor: Yong Chul Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 528 days.

(21) Appl. No.: 17/790,400

(22) PCT Filed: Nov. 13, 2020

(86) PCT No.: PCT/KR2020/015829
§ 371 (c)(1),
(2) Date: Jun. 30, 2022

(87) PCT Pub. No.: WO2021/137418
PCT Pub. Date: Jul. 8, 2021

(65) Prior Publication Data
US 2023/0307983 A1    Sep. 28, 2023

(30) Foreign Application Priority Data

Jan. 3, 2020 (KR) .......................... 10-2020-0000705

(51) Int. Cl.
*H02K 5/22* (2006.01)
*B62D 5/04* (2006.01)

(52) U.S. Cl.
CPC ............ *H02K 5/225* (2013.01); *B62D 5/0403* (2013.01)

(58) Field of Classification Search
CPC ............ H02K 3/522; H02K 3/50; H02K 3/28; H02K 3/505; H02K 3/38; H02K 3/345; H02K 3/52; H02K 5/225
See application file for complete search history.

(56) References Cited

U.S. PATENT DOCUMENTS

2015/0311764 A1    10/2015  Nakamura et al.

FOREIGN PATENT DOCUMENTS

| JP | 2016-59209 A | 4/2016 | |
| KR | 10-2011-0069088 A | 6/2011 | |
| KR | 10-2017-0128718 A | 11/2017 | |
| KR | 10-1917727 B1 | 11/2018 | |
| WO | WO-2019135549 A1 * | 7/2019 | ............... B62D 5/04 |

OTHER PUBLICATIONS

WO 2019135549 A1 Translation (Year: 2019).*
International Search Report dated Feb. 22, 2021 in International Application No. PCT/KR2020/015829.

* cited by examiner

*Primary Examiner* — Bryan R Perez
(74) *Attorney, Agent, or Firm* — SALIWANCHIK, LLOYD & EISENSCHENK

(57) ABSTRACT

An embodiment can provide a motor comprising: a shaft; a rotor coupled to the shaft; a stator disposed on the outer side of the rotor; and a bus bar which has a terminal unit connected to a coil of the stator and which is disposed above the stator, wherein the terminal unit includes a plurality of terminal groups the circuits of which are separated, and the plurality of terminal groups are arranged to form different layers in the axial direction of the shaft and are symmetrically arranged to rotate around the center of the stator.

8 Claims, 32 Drawing Sheets

MOTOR

CROSS-REFERENCE TO RELATED APPLICATIONS

This application is the U.S. national stage application of International Patent Application No. PCT/KR2020/015829, filed Nov. 13, 2020, which claims the benefit under 35 U.S.C. § 119 of Korean Application No. 10-2020-0000705, filed Jan. 3, 2020, the disclosures of each of which are incorporated herein by reference in their entirety.

TECHNICAL FIELD

The present invention relates to a motor.

BACKGROUND ART

An electric power steering (EPS) system is an apparatus which secures turning stability of a vehicle and rapidly provides a restoring force so that a driver can safely drive the vehicle. An EPS system controls a vehicle's steering shaft to be driven by driving a motor using an electronic control unit (ECU) according to driving conditions detected by a vehicle speed sensor, a torque angle sensor, a torque sensor, and the like.

A motor includes a rotor and a stator. Coils are wound around the stator. Connection ends of the coils wound around the stator may be connected to a busbar. The busbar includes a body and terminals. The terminals are connected to the connection ends of the coils. In addition, the terminals may be connected to external power sources through cables.

Terminals may be formed as a combination of phase terminals connected to U-phase, V-phase, and W-phase power sources and neutral terminals connecting the phase terminals. In this case, in order to secure the safety of a motor, a plurality of terminals of such a combination may be provided and circuit-divided. When an abnormality occurs at a circuit connected to any one terminal or at an element connected to the circuit, the motor can be driven through another terminal. In this case, the plurality of terminals are spatially divided (circuit-divided) in a body of a busbar.

However, since connection ends of the terminals are disposed at equal intervals, terminals having various shapes may be required.

When there are various shapes of terminals, since the number of molds increases, there are problems that costs increase, loss of material is also increased, and a manufacturing process is complicated.

In addition, in a process of injection molding a busbar, there are problems that errors of positions of a plurality of terminals occur easily, and it is difficult to visually check whether positions of neutral terminals or phase terminals are correct.

Accordingly, various studies have been conducted to simplify an assembly process by unifying shapes of a plurality of terminals and accurately securing a positional error of the terminals, but the studies are still not enough, and thus development of such a terminal is urgently required.

DISCLOSURE

Technical Problem

The present invention is directed to providing a motor in which shapes of terminals are unified, accurate positions of the terminals are secured in a process of molding a busbar, and an assembly process is simplified.

The present invention is directed to providing a motor in which various terminal groups are implemented by combining and arranging common terminals.

The present invention is directed to providing a motor capable of minimizing an increase in torque ripple and reducing noise and vibrations when some of a plurality of terminal groups are failed.

Objectives to be solved by the present invention are not limited to the above-described objectives, and other objectives, which are not described above, will be clearly understood by those skilled in the art from the following description.

Technical Solution

One aspect of the present invention provides a motor including a stator and a busbar disposed on the stator, wherein the busbar includes a busbar holder and a first terminal group, a second terminal group, and a third terminal group which are coupled to the busbar holder, each of the first terminal group, the second terminal group, and the third terminal group includes a plurality of terminals, each of which includes a terminal part, and the terminal part of one terminal of the plurality of terminals of the second terminal group is disposed between the terminal part of one terminal of the plurality of terminals of the first terminal group and the terminal part of one terminal of the plurality of terminals of the third terminal group.

The plurality of terminals may include a first terminal, a second terminal, and a third terminal.

Another aspect of the present invention provides a motor including a stator and a busbar disposed on the stator, wherein the busbar includes a busbar holder and a first terminal group, a second terminal group, and a third terminal group which are coupled to the busbar holder, each of the first terminal group, the second terminal group, and the third terminal group includes a first to third terminals, each of which includes a terminal part, a current is independently applied to each of the first to third terminal groups, and distances between the terminal parts of the first to third terminals of the first terminal group are the same.

Still another aspect of the present invention provides a motor including a stator and a busbar disposed on the stator, wherein the busbar includes a busbar holder and a first terminal group, a second terminal group, and a third terminal group which are coupled to the busbar holder, each of the first terminal group, the second terminal group, and the third terminal group include first to third terminals, each of which includes a terminal part, the terminal part of one terminal of the first to third terminals of the second terminal group and the terminal part of one terminal of the first to third terminals of the third terminal group are disposed between the terminal part of the first terminal of the first terminal group and the terminal part of the second terminal of the first terminal group.

Each of the first third terminals may include a body and the terminal part and a protruding portion which extend from the body, the terminal part may extend from one side of the body, and the protruding portion may extend from the other side of the body.

The terminal part may be coupled to a coil of the stator, and the protruding portion may be connected to an external power source.

A shape of at least one terminal among the first terminal, the second terminal, and the third terminal may be different from shapes of the remaining terminals.

Lengths of two bodies among the body of the first terminal, the body of the second terminal, and the body of the third terminal may be the same and greater than a length of the remaining one body.

The protruding portions of the first to third terminals of the first terminal group may be disposed in a first region of the busbar holder, the protruding portions of the first to third terminals of the second terminal group may be disposed in a second region of the busbar holder, the protruding portions of the first to third terminals of the third terminal group may be disposed in a third region of the busbar holder, and a distance between the first region and the second region may be the same as a distance between the second region and the third region.

The distance between the first region and the second region may be smaller than a distance between the first region and the third region.

Preferably, the first region, the second region, and the third region may be disposed in a first quadrant region among quadrant regions divided by an orthogonal axis (x-axis and y-axis) passing through passing through a center (C1) of the stator.

The busbar may include a fourth terminal group including first to third terminals, and the first to fourth terminal groups are electrically insulated from each other.

Each of the first to third terminals of the fourth terminal group may include a body and a terminal part and a protruding portion which extend from the body, the terminal part may extend from one side of the body, and the protruding portion may extend from the other side of the body.

The protruding portions of the first to third terminals of the first terminal group may be disposed in a first region of the busbar holder, the protruding portions of the first to third terminals of the second terminal group may be disposed in a second region of the busbar holder, the protruding portions of the first to third terminals of the third terminal group may be disposed in a third region of the busbar holder, the protruding portions of the first to third terminals of the fourth terminal group may be disposed in a fourth region of the busbar holder, and distances between the first region to the fourth region may be the same.

The terminal part of one terminal of the second or third terminal of the third terminal group and the terminal part of one terminal of the second or third terminal of the fourth terminal group may be disposed between the terminal part of the first terminal of the first terminal group and the terminal part of the first terminal of the second terminal group.

The one terminal of the second or third terminal of the third terminal group may be the second terminal, and the one terminal of the second or third terminal of the fourth terminal group may be the second terminal.

The one terminal of the second or third terminal of the third terminal group may be the second terminal, and the one terminal of the second or third terminal of the fourth terminal group may be the third terminal.

The first terminal group, the second terminal group, and the third terminal group may be disposed to form different layers in an axial direction, a first layer in which the first terminal group is disposed may include a first upper layer in which a plurality of first phase terminals are disposed and a first lower layer which is positioned under the first upper layer and in which a first neutral terminal is disposed, and a lower section of the first upper layer and an upper section of the first lower layer may be disposed to overlap in a radial direction.

Advantageous Effects

According to embodiments, since terminals having the same shape are combined to implement terminals connected to three or more divided circuits, advantageous effects of securing accurate positions of the terminals in a process of molding a busbar and simplifying an assembly process are provided.

In addition, according to the embodiments, although the plurality of terminals have the same shape, since it is easy to arrange protruding portions of the terminals at equal intervals, an advantageous effect of improving an insulation stability is provide.

In addition, according to the embodiments, even when some of a plurality of terminal groups which are circuit-separated are failed, since torque may be symmetrically generated at all sections of a stator about a center of the stator, advantageous effects of minimizing an increase in torque ripple and reducing noise and vibrations.

Various useful advantages and effects of the embodiments are not limited to the above-described contents and will be more easily understood from descriptions of the specific embodiments.

MODES OF THE INVENTION

Figure 1:
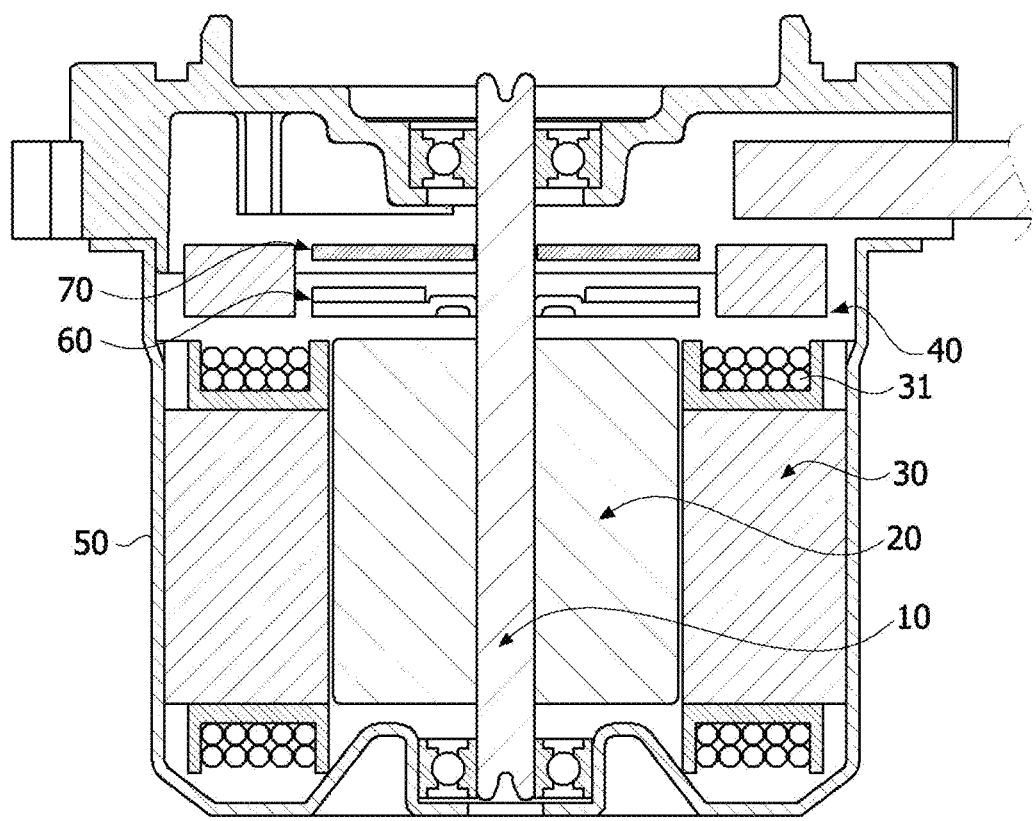
FIG. 1 is a cross-sectional view illustrating a motor according to an embodiment.

Hereinafter, exemplary embodiments of the present invention will be described in detail with reference to the accompanying drawings.

However, the technical spirit of the present invention is not limited to some embodiments which will be described and may be embodied in a variety of different forms, and at least one or more components of the embodiments may be selectively combined, substituted, and used within the range of the technical spirit.

In addition, unless clearly and specifically defined otherwise by the context, all terms (including technical and scientific terms) used herein can be interpreted as having meanings customarily understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, in the detailed description of the example embodiments of the invention with reference to the accompanying drawings, components that are the same or correspond to each other will be denoted by the same reference numerals in all of the figures, and redundant descriptions will be omitted.

Referring to FIGS. 1 to 14, a motor according to an embodiment may include a shaft 10, a rotor 20 coupled to the shaft 10, a stator 30 disposed outside the rotor 20, a plurality of terminal groups 110, 120, and 130 which are connected to coils 31 of the stator 30, and a busbar 40 disposed on the stator 30.

The shaft 10 may be coupled to the rotor 20, when an electromagnetic interaction occurs between the rotor 20 and the stator 30 due to the supply of a current, the rotor 20 rotates, and the shaft 10 rotates in conjunction with the rotor 20. As an example, the shaft 10 may be connected to a vehicle's steering shaft and may transmit power to the vehicle's steering shaft. In this case, a longitudinal direction of the shaft 10 may be referred to as an axial direction. In addition, a direction perpendicular to the axial direction may be referred to as a radial direction The rotor 20 rotates through an electrical interaction with the stator 30.

The rotor 20 may include a rotor core and magnets. As an example, the rotor core may be formed in a form in which a plurality of thin circular steel plates are stacked or in a single container form.

A hole (not shown) coupled to the shaft 10 may be formed in a central portion of the rotor core. Protrusions (not shown) which guide the magnets (not shown) may be formed to protrude from an outer circumferential surface of the rotor core. The magnets may be attached to the outer circumferential surface of the rotor core. The plurality of magnets may be disposed at predetermined intervals along a circumference of the rotor core.

In addition, the rotor 20 may include a can member (not shown) which surrounds the magnets to fix the magnets not to separate from the rotor core and inhibits the magnets from being exposed.

The stator 30 may include the coils 31 wound around the stator 30 to induce the electrical interaction with the rotor 20.

A specific structure for winding the coils 31 around the stator 30 will be described below. The stator 30 may include a stator core (not shown) including a plurality of teeth (not shown). The stator core may include an annular yoke (not shown) and the plurality of teeth which protrude from the yoke toward a center. The coils 31 may be wound around the teeth. In this case, the teeth may be formed at predetermined intervals along an outer circumferential surface of the yoke in a circumferential direction. Meanwhile, the stator core may be formed by stacking a plurality of thin steel plates. In addition, the stator core may be formed by coupling or connecting a plurality of divided cores.

In addition, the motor may include a housing 50 accommodating the rotor 20 and the stator 30 therein.

In addition, the motor may include a sensing magnet 60 and a printed circuit board 70.

The sensing magnet 60 is coupled to the shaft 10 to operate in conjunction with the rotor 20. The sensing magnet 60 is a device for detecting a position of the rotor 20.

A sensor which detects a magnetic force of the sensing magnet 60 may be disposed on the printed circuit board 70. As an example, the sensor may be a Hall integrated circuit (IC). In this case, the sensor detects changes in an N-pole and an S-pole of the sensing magnet 60 and generates a sensing signal.

The busbar 40 may include the plurality of terminal groups 110, 120, and 130 connected to the coils 31 of the stator 30 and a busbar holder 42. In addition, the busbar 40 may be disposed on the stator 30.

The busbar 40 may be formed as a structure including the plurality of terminal groups 110, 120, and 130 disposed in the busbar holder 42.

The busbar holder 42 may be a molded part formed through injection molding. In addition, the busbar holder 42 may be formed in an annual shape in which a hole (not shown) is formed in a central portion. The terminal group is disposed in the busbar holder 42, and terminal parts of terminals constituting the terminal groups are disposed to be exposed to the outside of the busbar holder 42. For reference, the busbar holder 42 may have a multilayer or single layer structure and be insert-injection-molded along with the plurality of terminal groups 110, 120, and 130.

Referring to FIGS. 2 to 14, a busbar 40 according to a first embodiment may include a first terminal group 110, a second terminal group 120, and a third terminal group 130. In addition, each of the first terminal group 110, the second terminal group 120, and the third terminal group 130 may include a plurality of terminals. In this case, a terminal part 101*b*, 102*b*, or 103*b* of one terminal of a plurality of terminals 122, 124, and 126 of the second terminal group 120 is disposed between a terminal part 101*b*, 102*b*, or 103*b* of one terminal of a plurality of terminals 112, 114, and 116 of the first terminal group 110 and a terminal part 101*b*, 102*b*, or 103*b* of one terminal of a plurality of terminals 132, 134, and 136 of the third terminal group 130. For example, the terminal part 102*b* of the terminal 122 of the second terminal group 120 may be disposed between the terminal part 103*b* of the terminal 116 of the first terminal group 110 and the terminal part 103*b* of the terminal 134 of the third terminal group 130 in a circumferential direction.

The first terminal group 110, the second terminal group 120, and the third terminal group 130 are electrically insulated (circuit-separated), and the first terminal group 110, the second terminal group 120, and the third terminal group 130 include the plurality of terminals 112, 114, 116, 122, 124, 126, 132, 134, and 136 having the terminal part 101*b*, 102*b*, and 103*b* and terminal parts 104*b*.

For reference, in the embodiment, the meaning of circuit-dividing the plurality of terminal groups 110, 120, and 130 is defined that the plurality of terminal groups 110, 120, and 130 are connected to the coils 31 of the stator 30 but are circuit-divided so that motor control circuits are formed independent of each other (see FIG. 10), and accordingly, a current may be independently supplied to each of the plurality of terminal groups 110, 120, and 130, and the plurality of terminal groups 110, 120, and 130 may independently drive a motor.

In addition, in the embodiment, the meaning of the plurality of terminal groups 110, 120, and 130 including the plurality of terminals 112, 114, 116, 122, 124, 126, 132, 134, and 136 is defined that the plurality of terminal groups 110, 120, and 130 include phase terminals connected to U-phase, V-phase, and W-phase power sources and a neutral terminal electrically connecting the phase terminals.

More specifically, the first terminal group 110 may include three phase terminals 112, 114, and 116 and one neutral terminal 118. In addition, the second terminal group 120 may include three phase terminals 122, 124, and 126 and one neutral terminal 128. In addition, the third terminal group 130 may include three phase terminals 132, 134, and 136 and one neutral terminal 138. In addition, referring to FIGS. 7 to 9, a part of each of the second terminals 114, 124, and 134 of the terminal groups 110, 120, and 130 may be disposed to overlap one of the neutral terminals 118, 128, and 138 in an axial direction.

Figure 7:
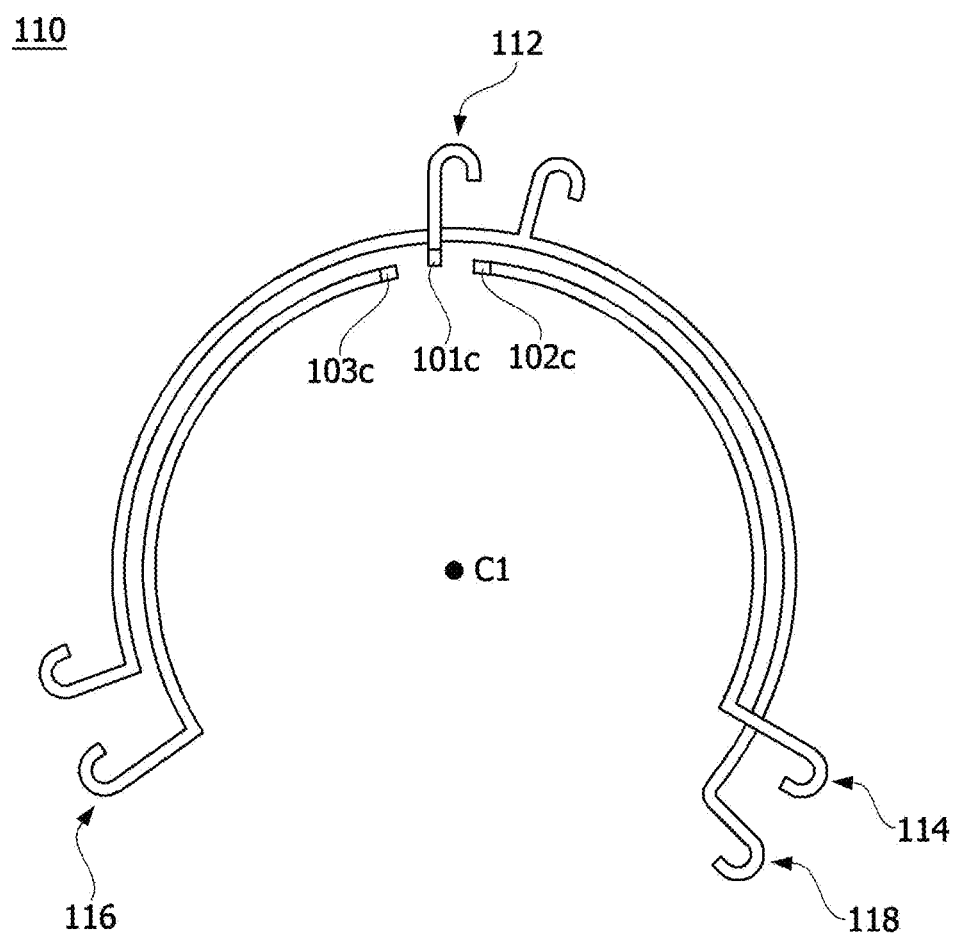
FIG. 7 is a plan view for describing a first terminal group in the motor according to the first embodiment.

Referring to FIG. 7, the first terminal group 110 includes a first terminal 112 (for example, a U1-phase), a second terminal 114 (for example, a V1-phase), and a third terminal 116 (for example, a W1-phase), in which the terminal parts 101*b*, 102*b*, and 103*b* are disposed at intervals of 120 degrees about a center C1 of the stator 30, and the neutral terminal. In this case, the center C1 of the stator 30 may be a rotation center of the shaft 10.

Figure 8:
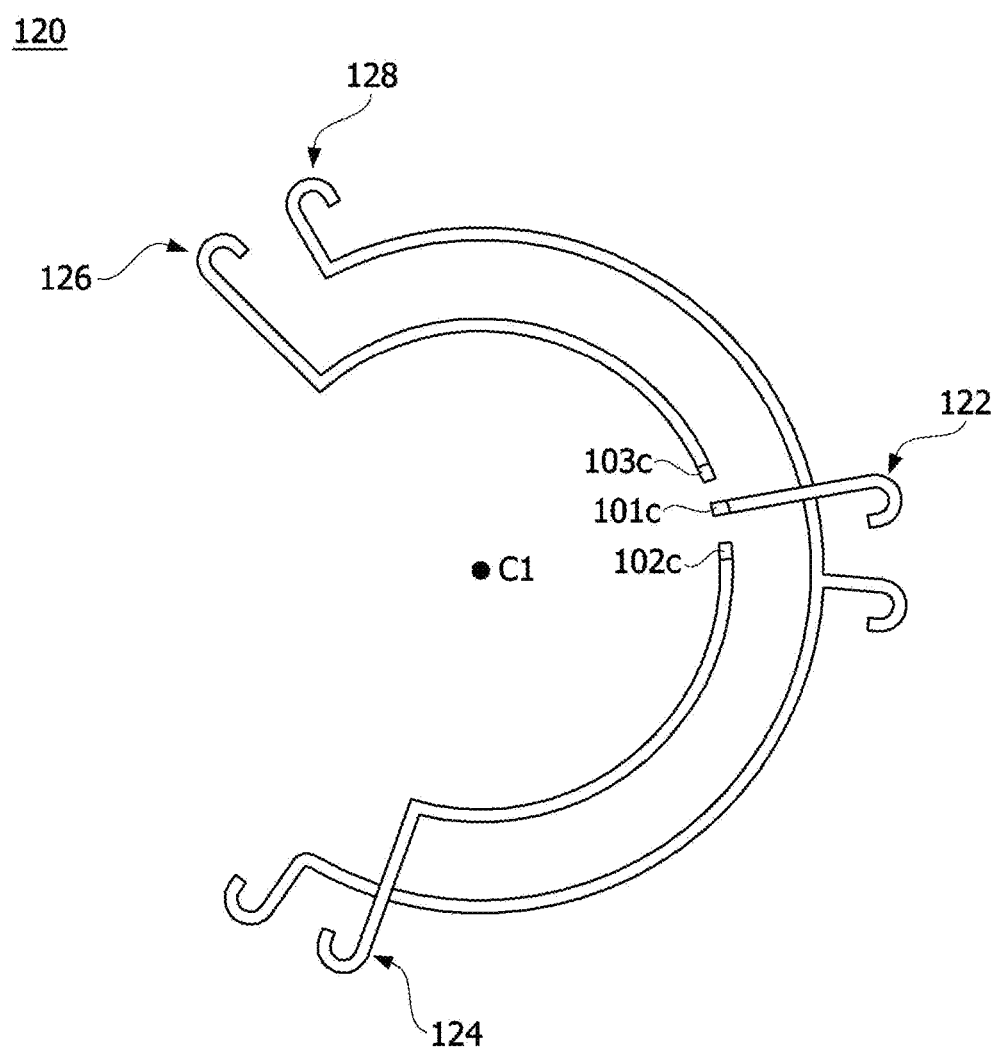
FIG. 8 is a plan view for describing a second terminal group in the motor according to the first embodiment.

Referring to FIG. 8, the second terminal group 120 includes a first terminal 122 (for example, a U2-phase), a second terminal 124 (for example, a V2-phase), a third terminal 126 (for example, a W2-phase), in which the terminal parts 101*b*, 102*b*, and 103*b* are disposed at intervals of 120 degrees about the center C1 of the stator 30, and the neutral terminal.

Figure 9:
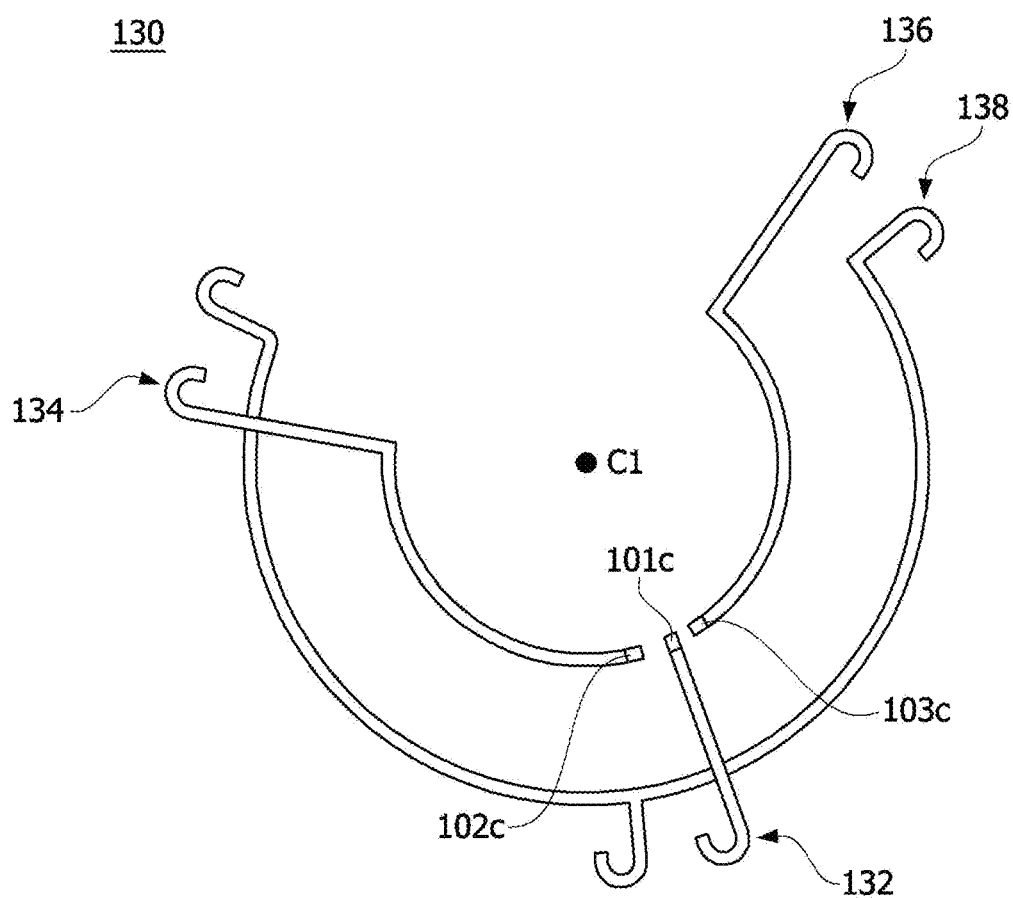
FIG. 9 is a plan view for describing a third terminal group in the motor according to the first embodiment.
Figure 10:
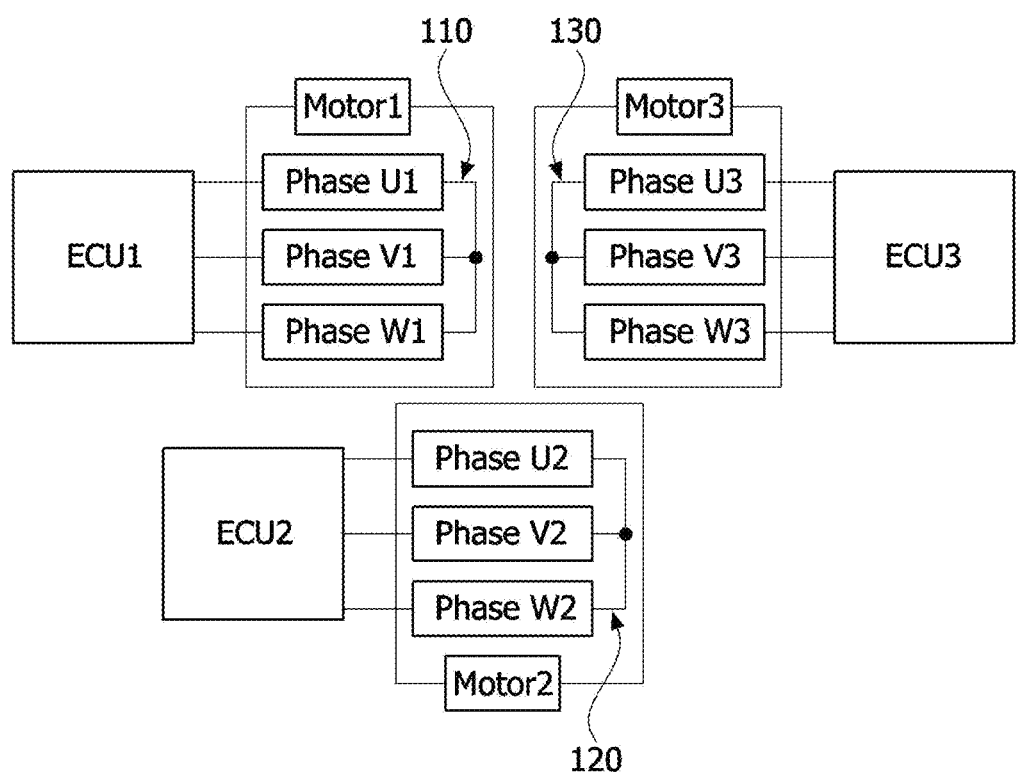
FIG. 10 is a view for describing a circuit configuration of terminal groups in the motor according to the first embodiment.

Referring to FIG. 9, the third terminal group 130 includes a first terminal 132 (for example, a U3-phase), a second terminal 134 (for example, a V3-phase, a third terminal 136 (for example, a W3-phase), in which the terminal parts 101*b*, 102*b*, and 103*b* are disposed at intervals of 120 degrees about the center C1 of the stator 30, and the neutral terminal.

For reference, in the embodiment, the meaning of arranging the terminal parts 101*b*, 102*b*, and 103*b* of the first terminals 112, 122, and 132, the second terminals 114, 124, and 134, and the third terminals 116, 126, and 136 of the terminal groups 110, 120, and 130 at intervals of 120 degrees is defined that the terminal parts 101*b*, 102*b*, and 103*b* of the first terminals 112, 122, and 132, the second terminals 114, 124, and 134, and the third terminals 116, 126, and 136 are disposed at intervals of 120 degrees about the center of the stator 30 (or a center of the busbar).

Figure 3:
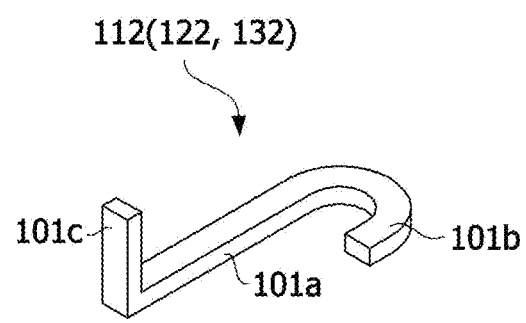
FIGS. 3 to 5 are perspective views for describing phase terminals in the motor according to the first embodiment.
Figure 4:
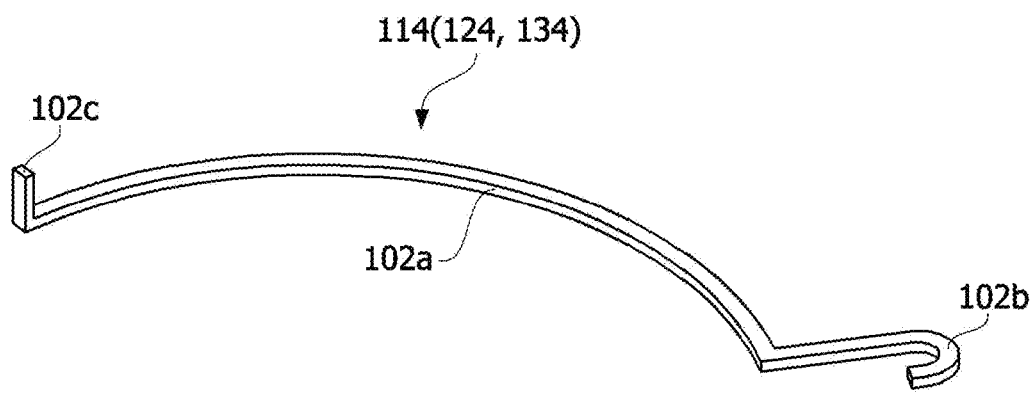
Figure 5:
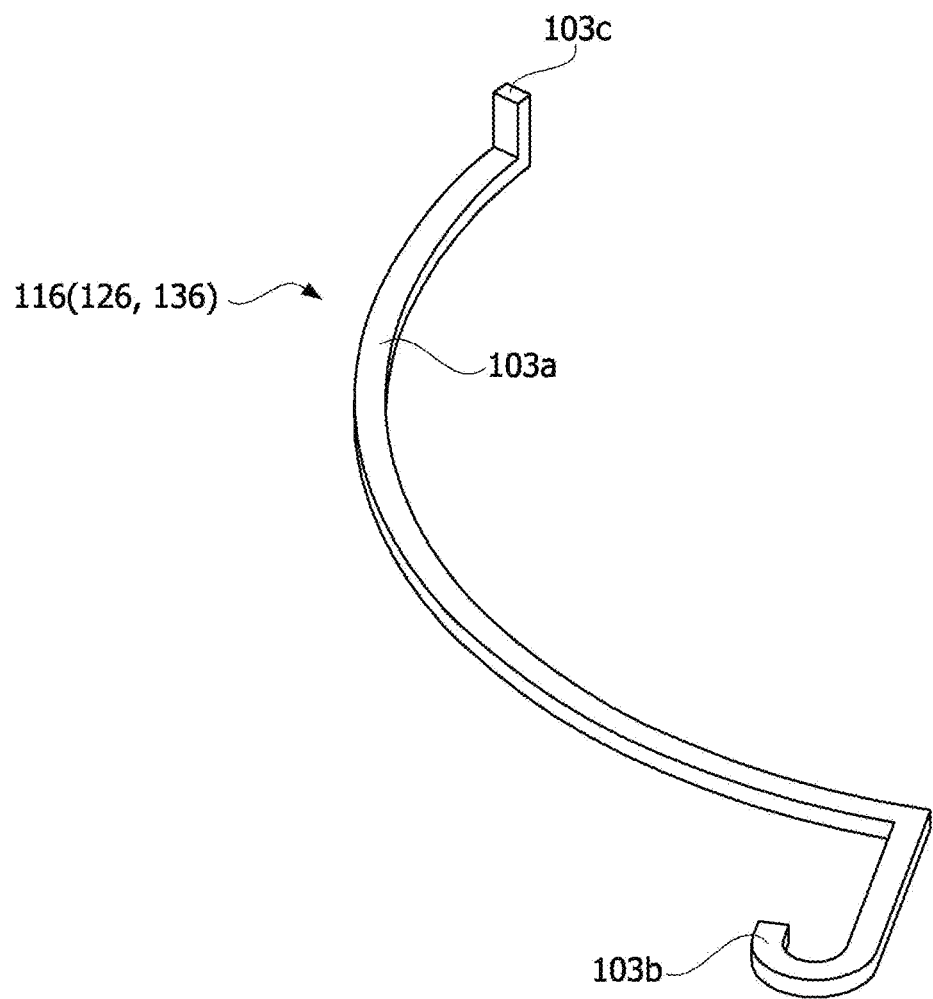

Referring to FIGS. 3 to 5, the first terminals 112, 122, and 132, the second terminals 114, 124, and 134, and the third terminals 116, 126, and 136 of the plurality of terminal groups 110, 120, and 130 may include bodies 101*a*, 102*a*, and 103*a*, terminal parts 101*b*, 102*b*, and 103*b* extending from one sides of the bodies 101*a*, 102*a*, and 103*a*, and protruding portions 101*c*, 102*c*, and 103*c* extending from the other sides of the bodies 101*a*, 102*a*, and 103*a*. For example, the first terminal group 110 may include the first terminal 112, the second terminal 114, and the third terminal 116. In addition, the first terminal 112 may include the body 101*a*, the terminal part 101*b* extending from one side of the body 101*a*, and the protruding portion 101*c* extending from the other side of the body 101*a*. In addition, the second terminal 114 may include the body 102*a*, the terminal part 102*b* extending from one side of the body 102*a*, and the protruding portion 102*c* extending from the other side body 102*a*. In addition, the third terminal 116 may include the body 103*a*, the terminal part 103*b* extending from one side of the body 103*a*, and the protruding portion 103*c* extending from the other side of the body 103*a*.

The bodies 101*a*, 102*a*, and 103*a* may be formed as a straight band type member or band type member having a curved surface. The bodies 101*a*, 102*a*, and 103*a*, the terminal parts 101*b*, 102*b*, and 103*b*, and the protruding portions 101*c*, 102*c*, and 103*c* may be divided and described only according to shapes and functional features thereof and may be one integrally connected member.

For example, bodies 101*a* of the first terminals 112, 122, and 132 of the first terminal group 110, the second terminal group 120, and the third terminal group 130 may each be formed as the straight band type member. However, the bodies 102*a* and 103*a* of the second terminals 114, 124, and 134 and the third terminals 116, 126, and 136 of the first terminal group 110, the second terminal group 120, and the third terminal group 130 may each be formed as the band type member having an arc shape with a predetermined curvature.

The terminal parts 101*b*, 102*b*, and 103*b* extend from a side surface (an outer side surface or inner side surface) of the body 101*a* and protrude from an outer side surface (or inner side surface) of the busbar holder 42 in a radial direction of the stator 30, and end portions of the terminal parts 101*b*, 102*b*, and 103*b* are each formed in a bent shape such as a hook.

The terminal parts 101*b*, 102*b*, and 103*b* are electrically connected to the coils 31 of the stator 30. As an example, the terminal parts 101*b*, 102*b*, and 103*b* may be fused to the coils 31 of the stator 30.

For reference, the bodies 101*a*, 102*a*, and 103*a* and the terminal parts 101*b*, 102*b*, and 103*b* may be formed as a single layer structure or double layer structure (multilayer structure).

However, the embodiment is not limited or restricted by connection structures of the bodies 101*a*, 102*a*, and 103*a* and the terminal parts 101*b*, 102*b*, and 103*b*.

The protruding portions 101*c*, 102*c*, and 103*c* may extend from upper surfaces of the bodies 101*a*, 102*a*, and 103*a* in a vertical direction (the axial direction), respectively, and be disposed to protrude from an upper surface of the busbar holder 42.

The protruding portions 101*c*, 102*c*, and 103*c* are electrically connected to external power cables of U-phases, V-phases, and W phases.

Figure 6:
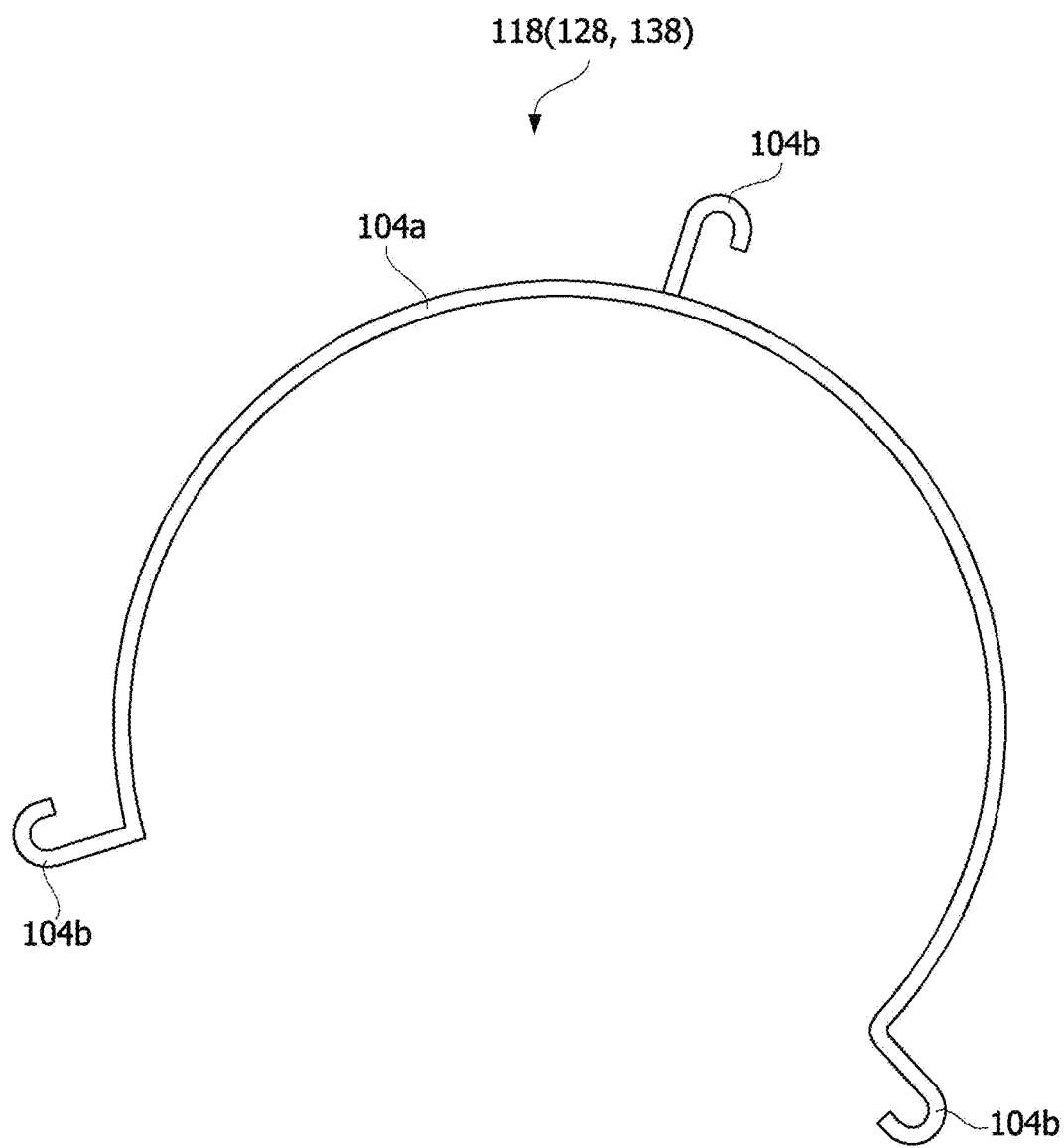
FIG. 6 is a plan view for describing a neutral terminal in the motor according to the first embodiment.

Referring to FIG. 6, each of the neutral terminals 118, 128, and 138 of the terminal groups includes a body 104*a* and three terminal parts 104*b* extending from one side of the body 104*a*.

As an example, the bodies 104*a* of the neutral terminals 118, 128, and 138 may each be formed as a band type member having an arc shape with a predetermined curvature.

The terminal parts 104*b* of the neutral terminals 118, 128, and 138 may be disposed to extend from side surfaces (outer side surfaces or inner side surfaces) of the bodies 104*a* of the neutral terminals 118, 128, and 138 in the radial direction of the stator 30 and to protrude from the outer side surface (or inner side surface) of the busbar holder 42. In addition, end portions of the terminal parts 104*b* may each be formed as a bent shape such as a hook.

The terminal parts 104*b* of the neutral terminals 118, 128, and 138 are electrically connected to the coils 31 of the stator 30. As an example, the terminal parts 104*b* of the neutral terminals 118, 128, and 138 may be fused to the coils 31 of the stator 30.

According to the exemplary embodiment, the body 102*a* of the second terminal 124 of the second terminal group 120 may be disposed inside the body 102*a* of the second terminal 114 of the first terminal group 110 in the radial direction of the stator 30. In addition, the body 102*a* of the second terminal 124 of the second terminal group 120 may be disposed outside the body 102*a* of the second terminal 134 of the third terminal group 130 in the radial direction of the stator 30. For example, the body 102*a* of the second terminal 124 of the second terminal group 120 may be disposed between the body 102*a* of the second terminal 114 of the first terminal group 110 and the body 102*a* of the second terminal 134 of the third terminal group 130 in the radial direction.

In this case, the terminal part 102*b* of the second terminal 134 of the third terminal group 130 may be disposed outside the body 102*a* of the third terminal 116 of the first terminal group 110 to cross the body 103*a* of the third terminal 116 of the first terminal group 110. In addition, the terminal part 103*b* of the third terminal 136 of the third terminal group 130 may be disposed outside the body 102*a* of the first terminal group 110 to sequentially cross the body 103*a* of the third terminal 126 of the second terminal group 130 and the body 102*a* of the second terminal 114 of the first terminal group 110. For example, a part of the second terminal 134 of the third terminal group 130 may be disposed to overlap the body 103*a* of the third terminal 116 of the first terminal group 110 in the axial direction. In addition, a part of the third terminal 136 of the third terminal group 130 may be disposed to overlap the body 103*a* of the third terminal 126 of the second terminal group 130 and the body 102*a* of the second terminal 114 of the first terminal group 110 in the axial direction.

According to another embodiment, a body of a second terminal of a first terminal group may also be disposed inside a body of a second terminal of a third terminal group. Alternatively, the body of the second terminal of the first terminal group may also be disposed inside a body of a second terminal of a second terminal group.

According to the exemplary embodiment, at least one terminal of each of the first terminals 112, 122, and 132, the second terminals 114, 124, and 134, and the third terminals 116, 126, and 136 of the terminal groups 110, 120, and 130 may be formed in a shape different from shapes of the remaining terminals.

As an example, among the bodies 101*a* of the first terminals 112, 122, and 132, the bodies 102*a* of the second terminals 114, 124, and 134, and bodies 103*a* of the third terminals 116, 126, and 136, lengths of two bodies are equal to each other and greater than a length of the remaining body.

More specifically, the first terminals 112, 122, and 132 of the terminal groups 110, 120, and 130 may be formed to have shapes and lengths of bodies which are different from shapes and lengths of bodies of the second terminals 114, 124, and 134 and the third terminals 116, 126, and 136 of the terminal groups 110, 120, and 130. In addition, the bodies of the second terminals 114, 124, and 134 and the third terminals 116, 126, and 136 of the terminal groups 110, 120, and 130 may be formed to have the same shape and the same length.

Accordingly, since structures (shapes) of the second terminals 114, 124, and 134 and the third terminals 116, 126, and 136 among the first terminals 112, 122, and 132, the second terminals 114, 124, and 134, and the third terminals 116, 126, and 136 of the terminal groups 110, 120, and 130 are the same, the second terminals 114, 124, and 134 and the third terminals 116, 126, and 136 of the terminal groups 110, 120, and 130 may be manufactured using one mold, and thus advantageous effect of simplifying a manufacturing process and reducing a manufacturing cost can be obtained.

According to the exemplary embodiment, shapes of the neutral terminals 118, 128, and 138 of the terminal groups 110, 120, and 130 may also be formed as the same structure. Accordingly, since the neutral terminals 118, 128, and 138 of the terminal groups 110, 120, and 130 may be manufactured using one mold, advantageous effect of simplifying a manufacturing process and reducing a manufacturing cost can be obtained.

Figure 2:
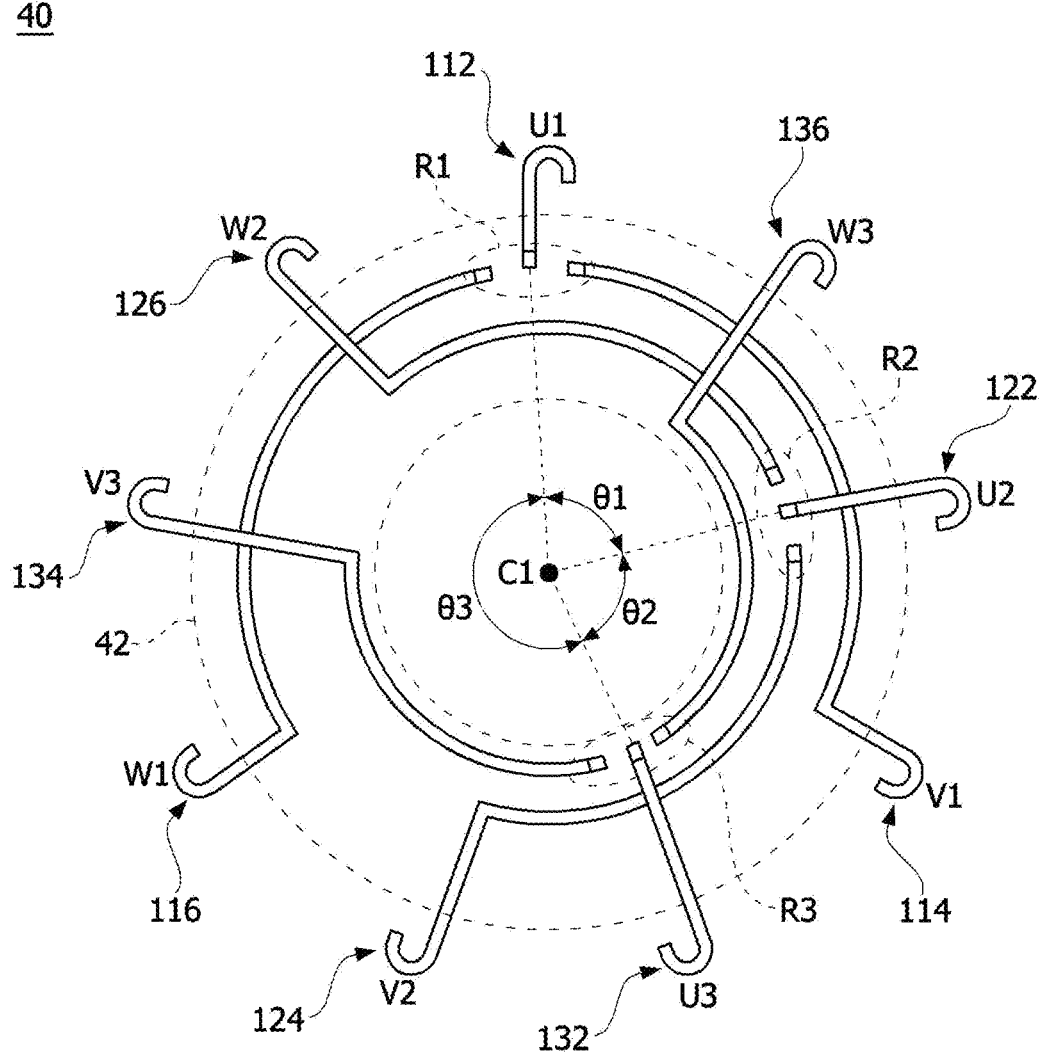
FIG. 2 is a plan view for describing a busbar in a motor according to a first embodiment.

Referring to FIG. 2, the terminal part 101b, 102b, or 103b of one terminal of the plurality of terminals 122, 124, and 126 of the second terminal group 120 may be disposed between the terminal part 101b, 102b, or 103b of one terminal of the plurality of terminals 112, 114, and 116 of the first terminal group 110 and the terminal part 101b, 102b, or 103b of one terminal of the plurality of terminals 132, 134, and 136 of the third terminal group 130.

As an example, the terminal part 102b of the second terminal 124 of the second terminal group 120 may be disposed between the terminal part 103b of the third terminal 116 of the first terminal group 110 and the terminal part 101b of the first terminal 132 of the third terminal group 130.

Similarly, the terminal part 101b of the first terminal 122 of the second terminal group 120 may be disposed between the terminal part 102b of the second terminal 114 of the first terminal group 110 and the terminal part 103b of the third terminal 136 of the third terminal group 130. In addition, the terminal part 103b of the third terminal 126 of the second terminal group 120 may be disposed between the terminal part 101b of the first terminal 112 of the first terminal group 110 and the terminal part 102b of the second terminal 134 of the third terminal group 130.

Accordingly, in the embodiment, since the terminal part 102b of the second terminal 124 of the second terminal group 120 is disposed between the terminal part 103b of the third terminal 116 of the first terminal group 110 and the terminal part 101b of the first terminal 132 of the third terminal group 130, the terminal parts 101b, 102b, and 103b of the plurality of terminal groups 110, 120, and 130 may be symmetrically disposed with respect to the center C1 of the stator 30, and thus a current may be symmetrically supplied through the plurality of terminal groups 110, 120, and 130 with respect to the center C1 of the stator 30.

In addition, referring to FIG. 2, according to the exemplary embodiment, the motor may include the stator 30, and the busbar 40 disposed on the stator 30, and the busbar 40 may include the busbar holder 42, and the first terminal group 110, the second terminal group 120, and the third terminal group 130 which are coupled to the busbar holder 42. In addition, the first terminal group 110, second terminal group 120, and third terminal group 130 may include the first terminal to third terminals 112, 114, 116, 122, 124, 126, 132, 134, and 136 having the terminal parts 101b, 102b, and 103b. In addition, the terminal parts 101b, 102b, or 103b of one terminal of the first terminal to third terminals 122, 124, and 126 of the second terminal group 120 and the terminal parts 101b, 102b, or 103b of one terminal of the first terminal to third terminals 132, 134, and 136 of the third terminal group 130 are disposed between the terminal part 101b of the first terminal 112 of the first terminal group 110 and the terminal part 102b of the second terminal 114 of the first terminal group 110. That is, one terminal part of the second terminal group 120 and one terminal part of the third terminal group 130 may be disposed between two terminal parts of the first terminal group 110 in the circumferential direction.

As an example, the terminal part 101b of the first terminal 122 of the second terminal group 120 and the terminal part 103b of the third terminal 136 of the third terminal group 130 may be disposed between the terminal part 101b of the first terminal 122 of the first terminal group 110 and the terminal part 102b of the second terminal 114 of the first terminal group 110.

Similarly, the terminal part 103b of the third terminal 126 of the second terminal group 120 and the terminal part 102b of the second terminal 134 of the third terminal group 130 may be disposed between the terminal part 103b of the third terminal 116 of the first terminal group 110 and the terminal part 101b of the first terminal 112 of the first terminal group 110. In addition, the terminal part 102b of the second terminal 124 of the second terminal group 120 and the terminal part 101b of the first terminal 132 of the third terminal group 130 may be disposed between the terminal part 102b of the second terminal 114 of the first terminal group 110 and the terminal part 103b of the third terminal 116 of the first terminal group 110.

Accordingly, in the embodiment, since the terminal part 101b of the first terminal 122 of the second terminal group 120 and the terminal part 103b of the third terminal 136 of the third terminal group 130 are disposed between the terminal part 101b of the first terminal 122 of the first terminal group 110 and the terminal part 102b of the second terminal 114 of the first terminal group 110, the terminal parts 101b, 102b, and 103b of the plurality of terminal groups 110, 120, and 130 may be symmetrically disposed with respect to the center C1 of the stator 30, and thus a current may be symmetrically supplied through the plurality of terminal groups 110, 120, and 130 with respect to the center C1 of the stator 30.

According to the exemplary embodiment, the terminal parts 101b, 102b, and 103b of the terminals of the first terminal group 110, the second terminal group 120, and the third terminal group 130 which are circuit-separated (electrically insulated) from each other are disposed at equal intervals about the center C1 of the stator 30.

More specifically, the third terminal 136 of the third terminal group 130, the first terminal 122 of the second terminal group 120, the second terminal 114 of the first terminal group 110, the first terminal 132 of the third terminal group 130, the second terminal 124 of the second terminal group 120, the third terminal 116 of the first terminal group 110, the second terminal 134 of the third terminal group 130, and the third terminal 126 of the second terminal group 120 are sequentially disposed at intervals of 40 degrees in a clockwise direction about the center C1 of the stator 30 from the first terminal 112 of the first terminal group 110 disposed in a 12 o'clock direction.

Figure 31:
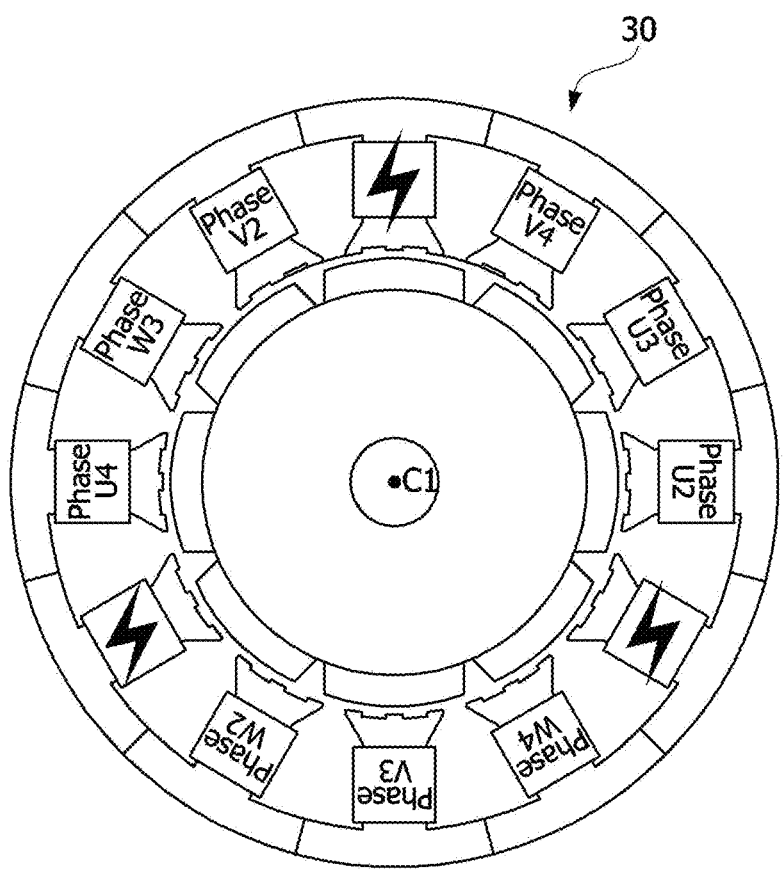
FIG. 31 is a view for describing a failure state of the first terminal group in the motor according to the fourth embodiment.

Accordingly, in the embodiment, since the terminal parts 101b, 102b, and 103b of the terminals 112, 114, 116, 122, 124, 126, 132, 134, and 136 of the plurality of terminal groups 110, 120, and 130 which are circuit-divided are disposed at equal intervals about the center C1 of the stator 30, even when a specific terminal group (for example, the first terminal group) among the plurality of terminal groups 110, 120, and 130 is failed (see FIG. 31), a current may be symmetrically applied through the remining normal terminal groups which operate normally about the center C1 of the stator 30 (for example, a current may be applied to the coils at equal intervals of 120 degrees about the center of the stator), and thus advantageous effect of minimizing an increase in torque ripple and improving driving stability and reliability of the motor can be obtained.

According to the exemplary embodiment, the protruding portions 101c, 102c, and 103c of the first to third terminals 112, 114, and 116 of the first terminal group 110 may be disposed in a first region R1 of the busbar holder 42, the protruding portions 101c, 102c, and 103c of the first to third terminals 122, 124, and 126 of the second terminal group 120 may be disposed in a second region R2 of the busbar holder 42, and the protruding portions 101c, 102c, and 103c of the first to third terminals 132, 134, and 136 of the third terminal group 130 may be disposed in a third region R3 of the busbar holder 42. In this case, an angular distance between the first region R1 and the second region R2 is the same as an angular distance between the second region R2 and the third region R3.

As an example, referring to FIG. 2, the protruding portions 101c, 102c, and 103c of the first to third terminals 112, 114, and 116 of the first terminal group 110 may be disposed in the first region R1 of the busbar holder 42 defined in the 12 o'clock direction (in FIG. 2). In addition, the protruding portions 101c, 102c, and 103c of the first to third terminals 122, 124, and 126 of the second terminal group 120 may be disposed in the second region R2 of the busbar holder 42 defined to be spaced at 80 degrees ($\theta1$) from the first region R1 in the clockwise direction about the center C1 of the stator 30. In addition, the protruding portions 101c, 102c, and 103c of the first to third terminals 132, 134, and 136 of the third terminal group 130 may be disposed in the third region R3 of the busbar holder 42 defined to be spaced at 80 degrees ($\theta2$) from the second region R2 in the clockwise direction about the center C1 of the stator 30.

Accordingly, since the angular distance between the first region R1 and the second region R2 is defined the same as the angular distance between the second region R2 and the third region R3, the terminal parts 101b, 102b, and 103b of the plurality of terminal groups 110, 120, and 130 may be symmetrically disposed with respect to the center C1 of the stator 30.

In addition, according to the exemplary embodiment, the sum ($\theta1+\theta2$) of the angular distance ($\theta1$) between the first region R1 and the second region R2 and the angular distance ($\theta2$) between the first region R2 and the second region R3 may be defined to be smaller than an angular distance ($\theta3$) between the first region R1 and the third region R3.

As an example, it can be defined that the angular distance ($\theta1$) between the first region R1 and the second region R2 is 80 degrees about the center C1 of the stator 30, and it can be defined that the angular distance ($\theta3$) between the first region R1 and the third region R3 is 200 degrees.

Accordingly, since the angular distance between first region R1 and the second region R2 is smaller than the angular distance between the first region R1 and the third region R3, the terminal parts 101b, 102b, and 103b of the plurality of terminal groups 110, 120, and 130 may be symmetrically disposed with respect to the center C1 of the stator 30.

Meanwhile, referring to FIGS. 11 to 14, in the busbar holder 42, a layout of the terminal parts 101b, 102b, and 103b of the first to third terminals 112, 114, 116, 122, 124, 126, 132, 134, and 136 and the terminal parts 104b of the neutral terminals 118, 128, and 138 may be variously changed according to required conditions and design specifications.

Figure 11:
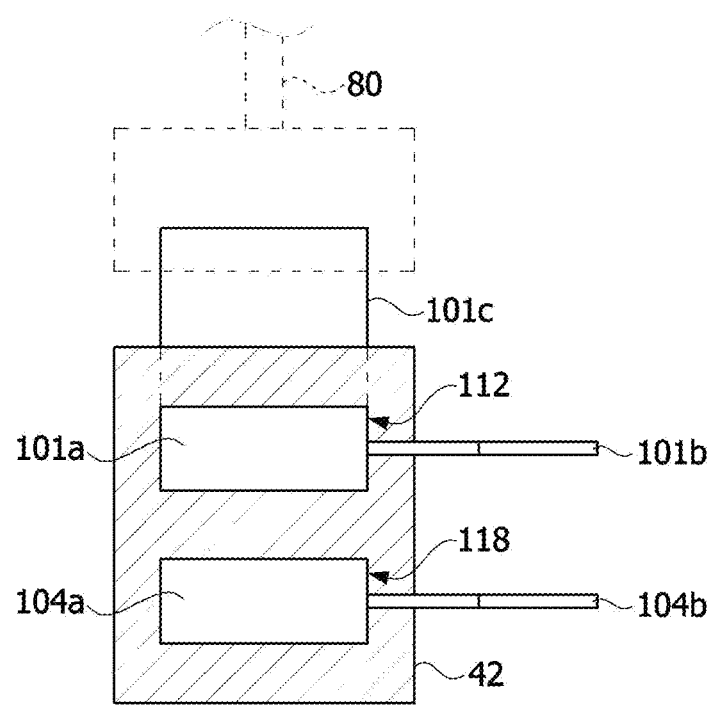
FIGS. 11 to 14 are cross-sectional views for describing a layout of the phase terminal and the neutral terminal in the motor according to the first embodiment.

Referring to FIG. 11, the terminal parts 101b, 102b, and 103b of the first to third terminals 112, 114, 116, 122, 124, 126, 132, 134, and 136 and the terminal parts 104b of the neutral terminals 118, 128, and 138 may be disposed on the busbar holder 42 to form a double layer structure (multilayer structure). In this case, the terminal parts 101b, 102b, and 103b of the first to third terminals 112, 114, 116, 122, 124, 126, 132, 134, and 136 and the terminal parts 104b of the neutral terminals 118, 128, and 138 may protrude from the outer side surface of the busbar holder 42.

Figure 12:
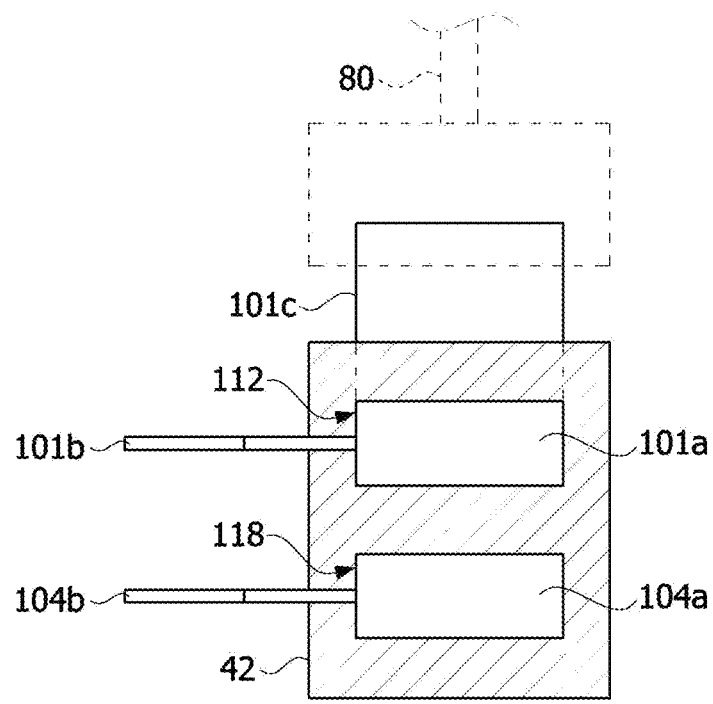

Referring to FIG. 12, the terminal parts 101b, 102b, and 103b of the first to third terminals 112, 114, 116, 122, 124, 126, 132, 134, and 136 and the terminal parts 104b of the neutral terminals 118, 128, and 138 may be disposed on the busbar holder 42 to form the double layer structure (multilayer structure). In this case, the terminal parts 101b, 102b, and 103b of the first to third terminals 112, 114, 116, 122, 124, 126, 132, 134, and 136 and the terminal parts 104b of the neutral terminals 118, 128, and 138 may also protrude from the inner side surface of the busbar holder 42.

Figure 13:
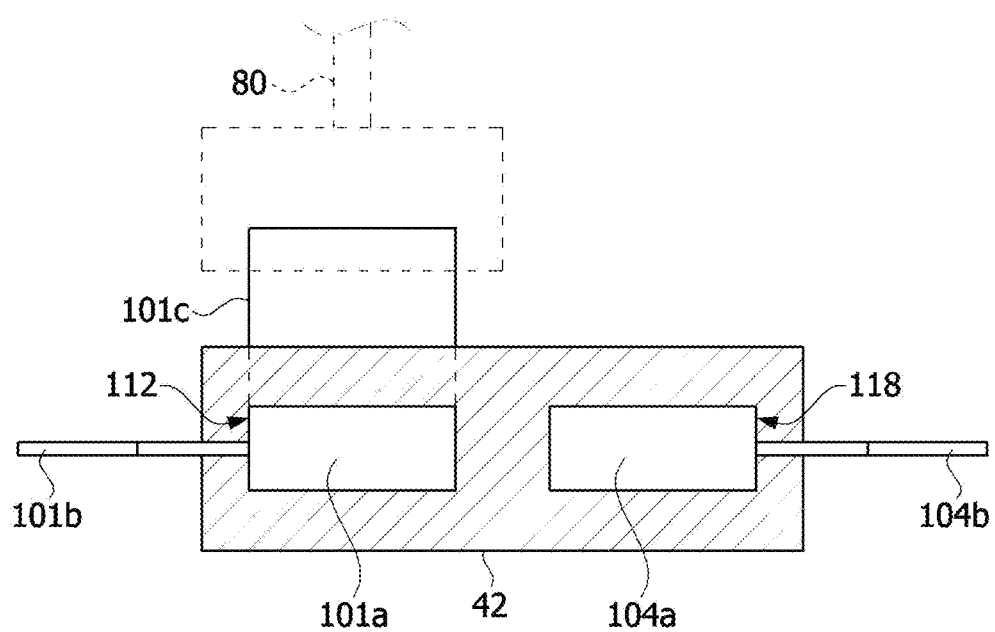

Referring to FIG. 13, the terminal parts 101b, 102b, and 103b of the first to third terminals 112, 114, 116, 122, 124, 126, 132, 134, and 136 and the terminal parts 104b of the neutral terminals 118, 128, and 138 may be disposed on the busbar holder 42 to form a single layer structure. In this case, the terminal parts 101b, 102b, and 103b of the first to third terminals 112, 114, 116, 122, 124, 126, 132, 134, and 136 may protrude from the inner side surface of the busbar holder 42, and the terminal parts 104b of the neutral terminals 118, 128, and 138 may protrude from the outer side surface of the busbar holder 42.

According to another embodiment, terminal parts 101b, 102b, and 103b of first to third terminals 112, 114, 116, 122, 124, 126, 132, 134, and 136 and terminal parts 104b of neutral terminals 118, 128, and 138 may be disposed on a busbar holder 42 to form a single layer structure. In addition, the terminal parts 101b, 102b, and 103b of the first to third terminals 112, 114, 116, 122, 124, 126, 132, 134, and 136 may also protrude from an outer side surface of the busbar holder 42, and the terminal parts 104b of the neutral terminals 118, 128, and 138 may also protrude from an inner side surface of the busbar holder 42.

Figure 14:
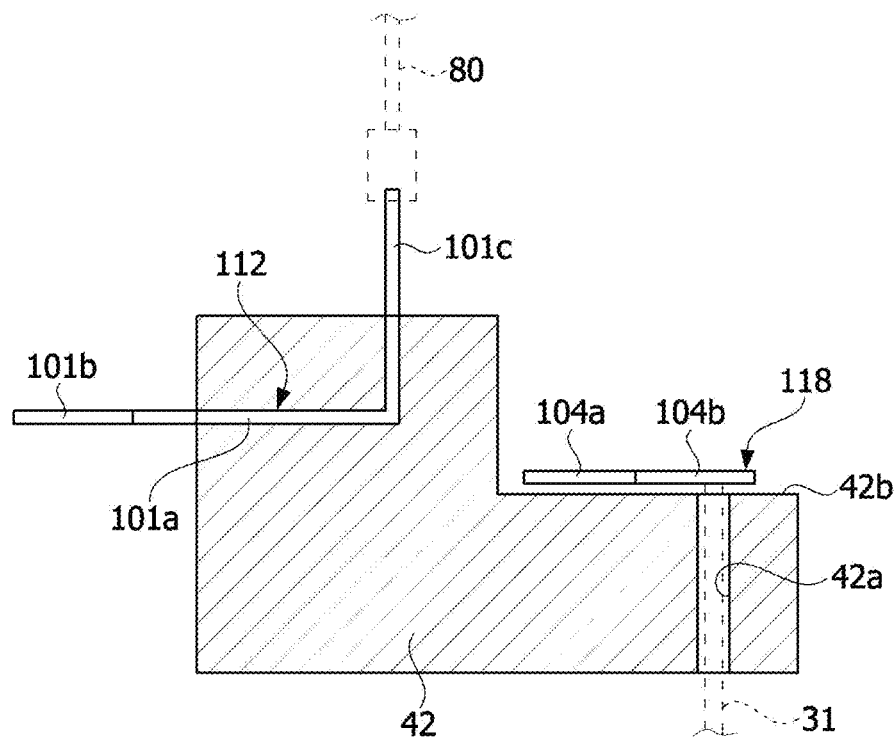

Referring to FIG. 14, only terminal parts 101b, 102b, and 103b of first to third terminals 112, 114, 116, 122, 124, 126, 132, 134, and 136 may be insert-injection-molded along with busbar holder 42, and terminal parts 104b of neutral terminals 118, 128, and 138 may be disposed outside the busbar holder 42.

As an example, a recessed groove 42b may be formed in one side of the upper surface of the busbar holder 42, and the terminal parts 104b of the neutral terminals 118, 128, and 138 may be disposed in the groove 42b. In addition, holes 42a which vertically pass through the busbar holder 42 may be formed in the busbar holder 42, and coils 31 of a stator 30 may be disposed to pass through the holes 42a and fused to the terminal parts 104b of the neutral terminals 118, 128, and 138. As illustrated in FIG. 14, a stepped structure may be formed in the busbar holder 42, and the terminal parts 104b of the neutral terminals 118, 128, and 138 may be disposed on the stepped structure. In this case, the terminal parts 104b of the neutral terminals 118, 128, and 138 disposed on the steeped structure may be coupled to the coils passing through the holes 42a.

According to another embodiment, terminal parts 104b of neutral terminals 118, 128, and 138 may also be insert-injection-molded along with a busbar holder 42, and terminal parts 101b, 102b, and 103b of first to third terminals 112, 114, 116, 122, 124, 126, 132, 134, and 136 may also be disposed outside the busbar holder 42.

FIGS. 15 to 19 are views for describing a motor according to a second embodiment. In addition, components that are the same as or correspond to the above-described components will be denoted by the same reference numerals, and redundant descriptions will be omitted.

Referring to FIGS. 15 to 19, the motor according to the second embodiment may include a stator 30 and a busbar 40 disposed on the stator 30, the busbar 40 may include a busbar holder 42 and a first terminal group 110, a second terminal group 120, and a third terminal group 130 which are coupled to the busbar holder 42, and the first terminal group 110, the second terminal group 120, and the third terminal group 130 may include first to third terminals 112, 114, 116, 122, 124, 126, 132, 134, and 136 including terminal parts 101b, 102b, and 103b, and the terminal part 101b of the first terminal 122 of the second terminal group 120 may be disposed between the terminal part 101b of the first terminal 112 of the first terminal group 110 and the terminal part 101b of the first terminal 132 of the third terminal group 130.

Figure 16:
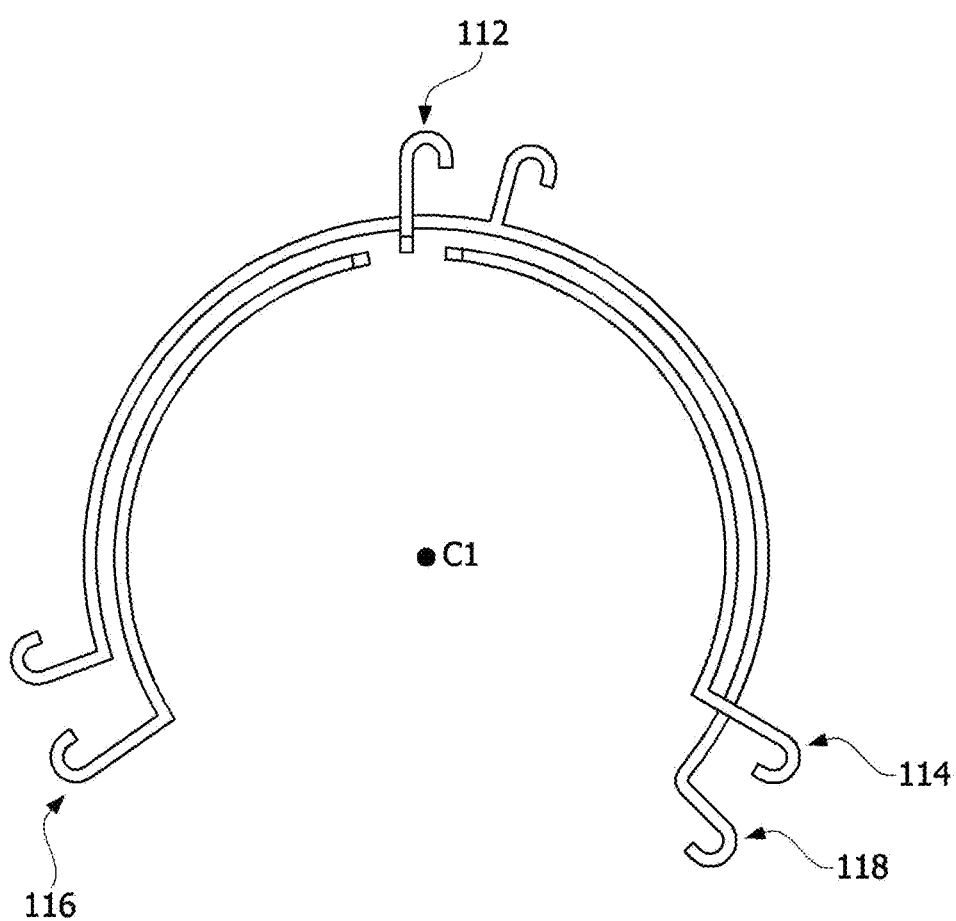
FIG. 16 is a plan view for describing a first terminal group in the motor according to the second embodiment.

Referring to FIG. 16, the first terminal group 110 may include the first terminal 112 (for example, a U1-phase), the second terminal 114 (for example, a V1-phase), the third terminal 116 (for example, a W1-phase), in which the terminal parts 101b, 102b, and 103b are disposed at intervals of 120 degrees about a center C1 of the stator 30, and a neutral terminal. That is, the first terminal group 110 may include the first terminal 112 (for example, the U1-phase), the second terminal 114 (for example, the V1-phase), the third terminal 116 (for example, the W1-phase), and the neutral terminal. In addition, the terminal part 101b of the first terminal 112, the terminal part 102b of the second terminal 114, and the terminal part 103b of the third terminal 116 may be disposed at intervals of 120 degrees.

Figure 17:
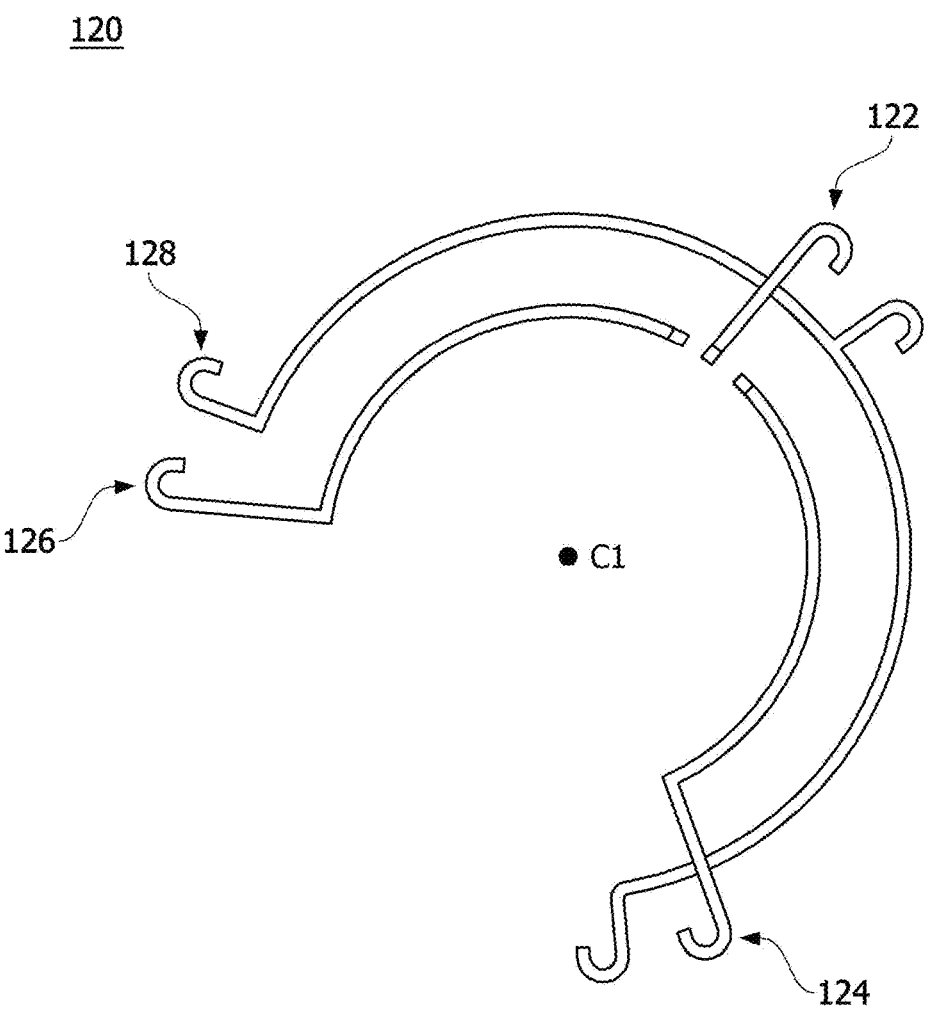
FIG. 17 is a plan view for describing a second terminal group in the motor according to the second embodiment.

Referring to FIG. 17, the second terminal group 120 may include the first terminal 122 (for example, a U2-phase), the second terminal 124 (for example, a V2-phase), the third terminal 126 (for example, a W2-phase), in which the terminal parts 101b, 102b, and 103b are disposed at intervals of 120 degrees about the center C1 of the stator 30, and a neutral terminal. That is, the second terminal group 120 may include the first terminal 122 (for example, the U2-phase), the second terminal 124 (for example, the V2-phase), the third terminal 126 (for example, the W2-phase), and the neutral terminal. In addition, the terminal part 101b of the first terminal 122, the terminal part 102b of the second terminal 124, and the terminal part 103b of the third terminal 126 may be disposed at intervals of 120 degrees in a circumferential direction.

Figure 18:
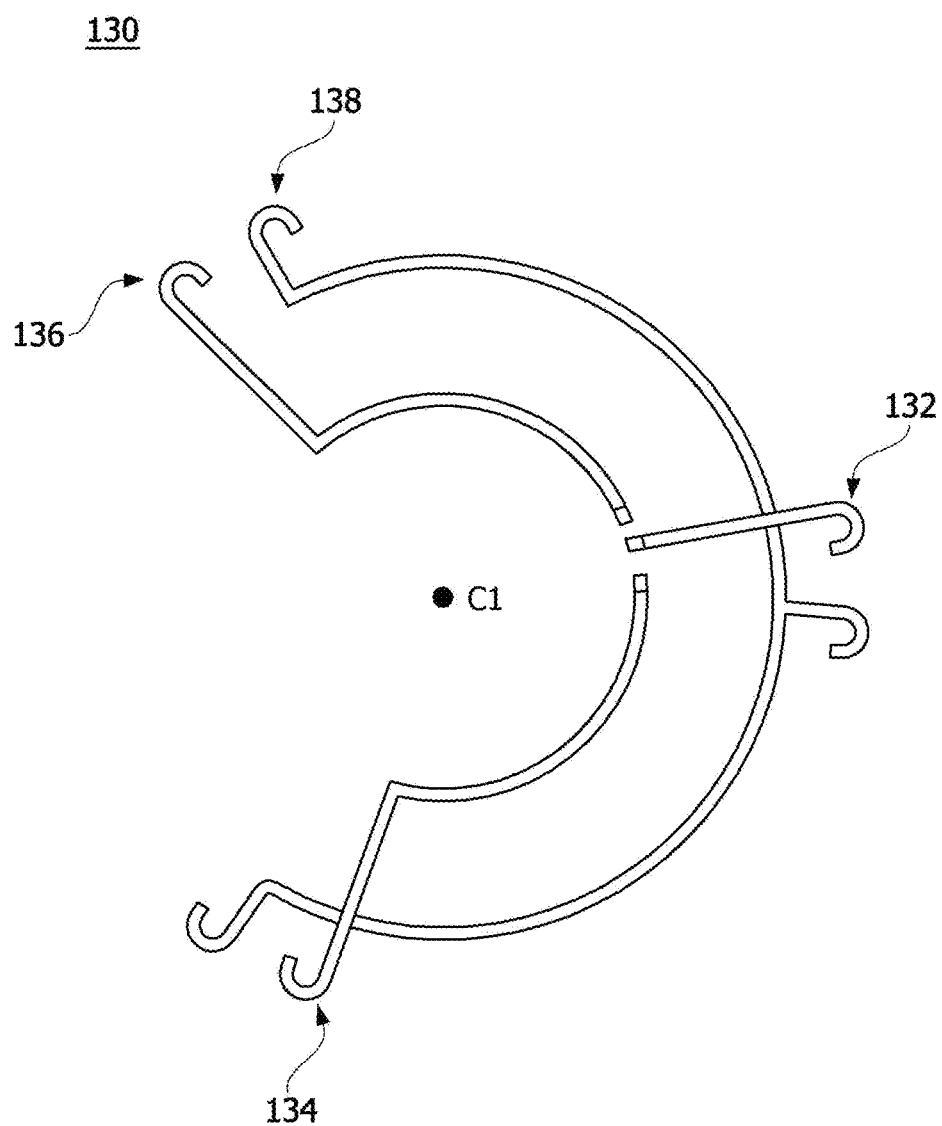
FIG. 18 is a plan view for describing a third terminal group in the motor according to the second embodiment.
Figure 19:
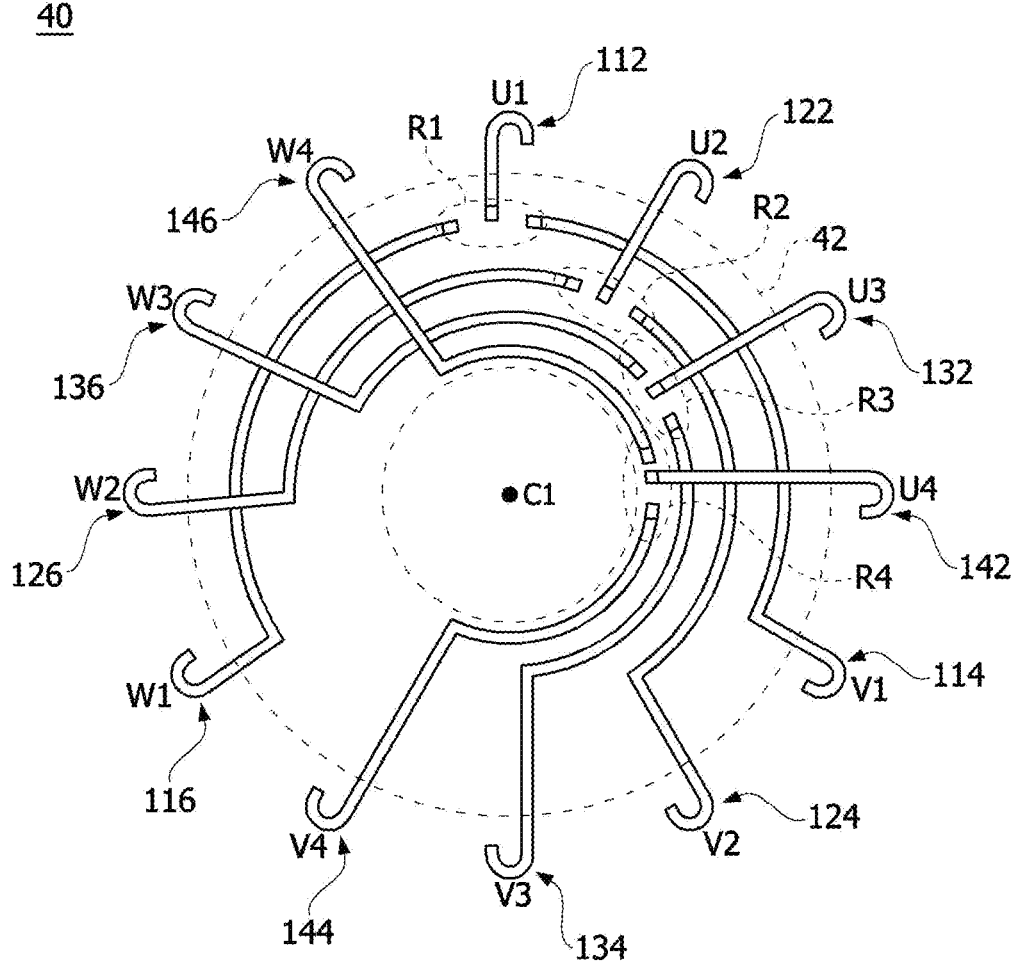
FIG. 19 is a plan view for describing a busbar in a motor according to a third embodiment.
Figure 20:
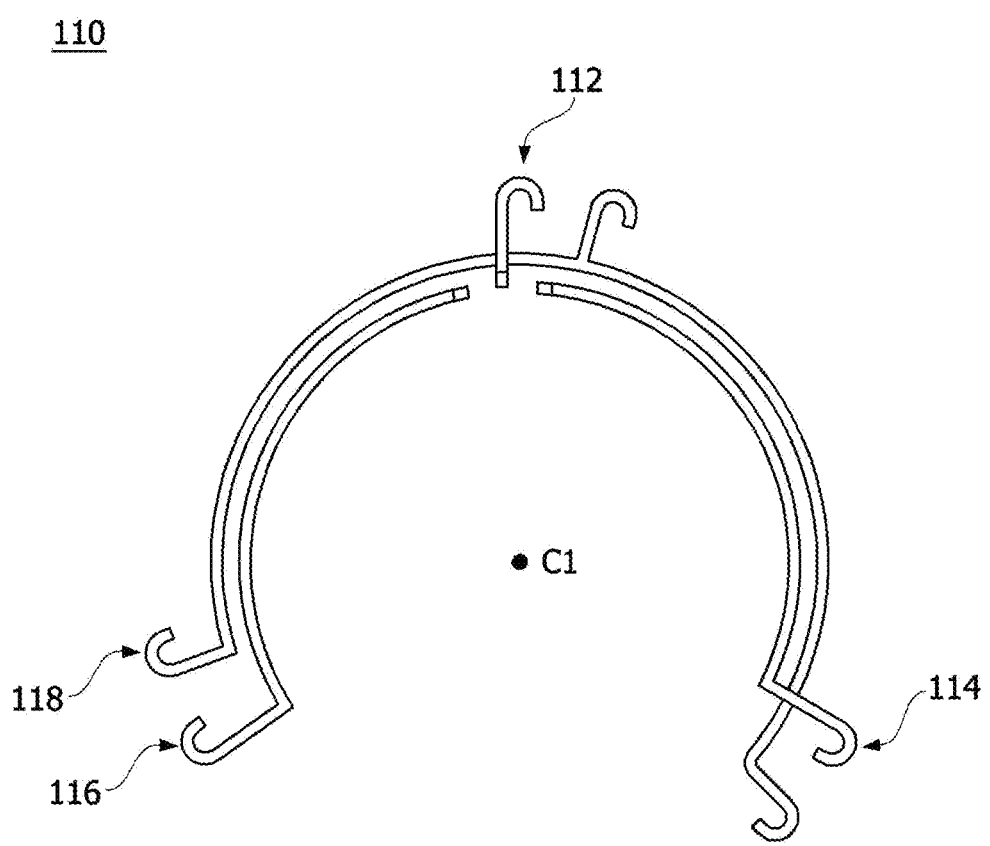
FIG. 20 is a plan view for describing a first terminal group in the motor according to the third embodiment.
Figure 21:
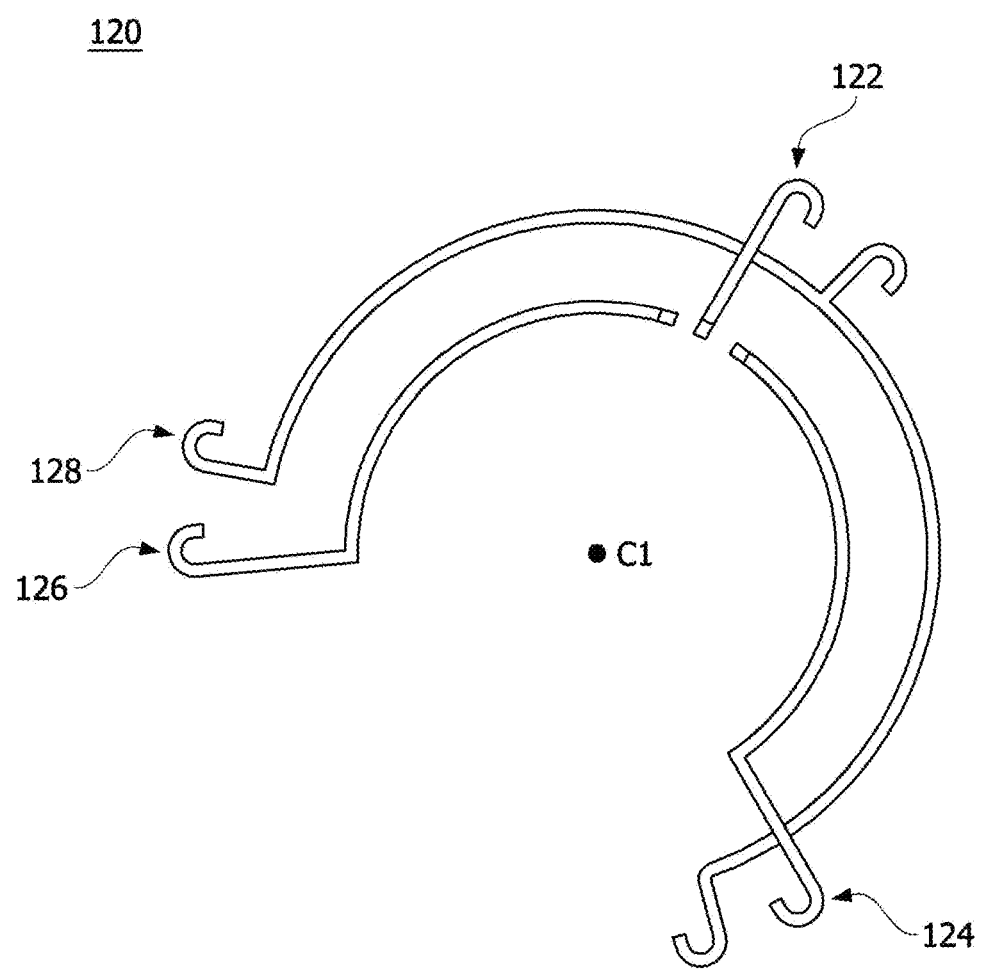
FIG. 21 is a plan view for describing a second terminal group in the motor according to the third embodiment.
Figure 22:
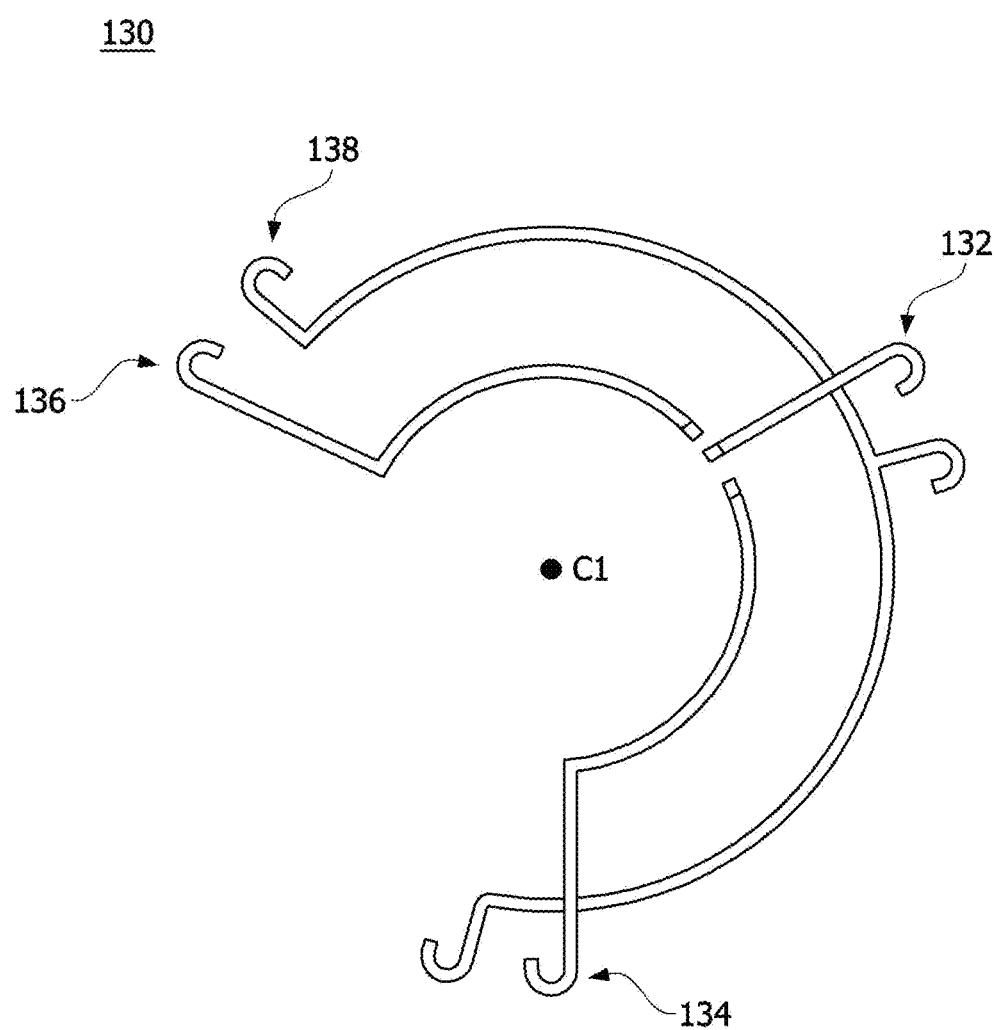
FIG. 22 is a plan view for describing a third terminal group in the motor according to the third embodiment.
Figure 23:
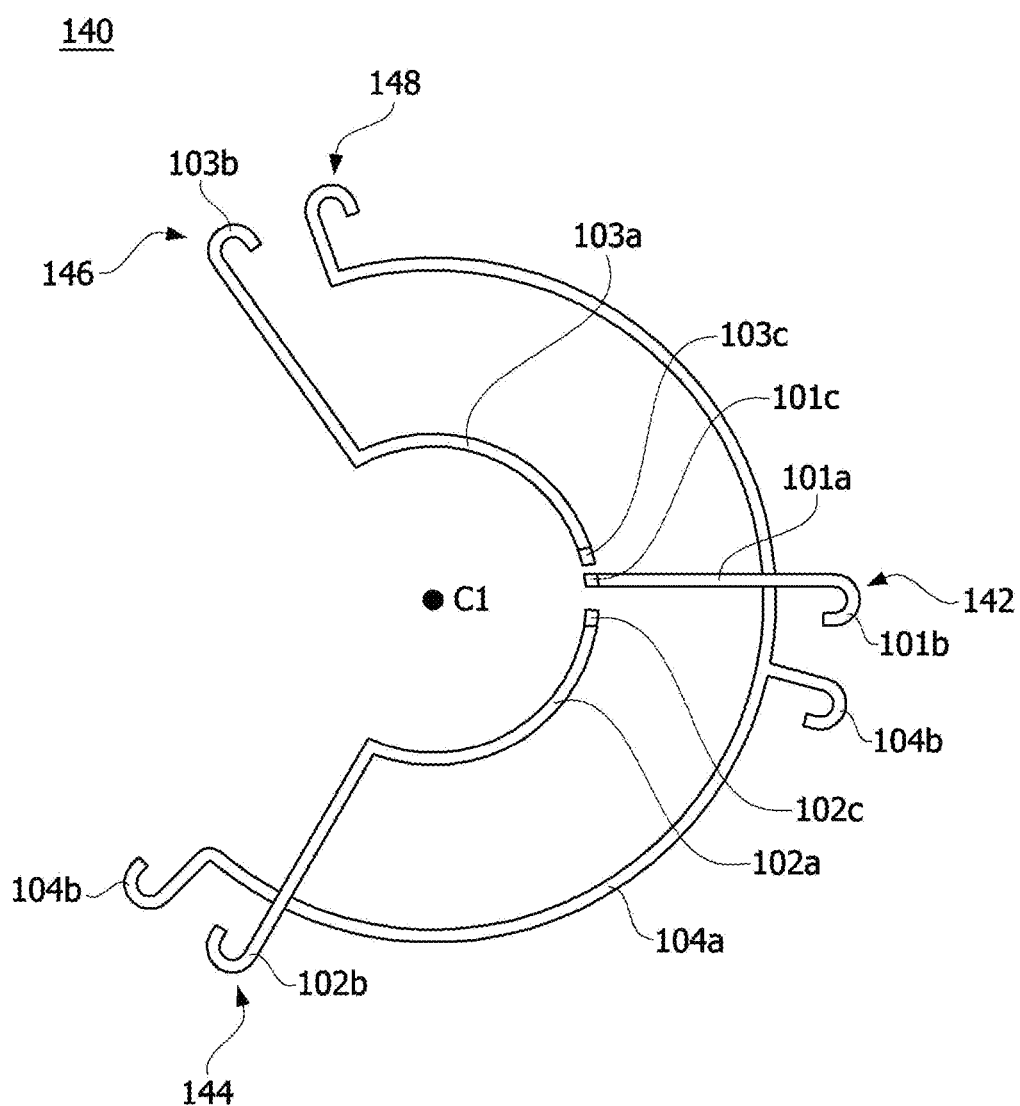
FIG. 23 is a plan view for describing a fourth terminal group in the motor according to the third embodiment.
Figure 24:
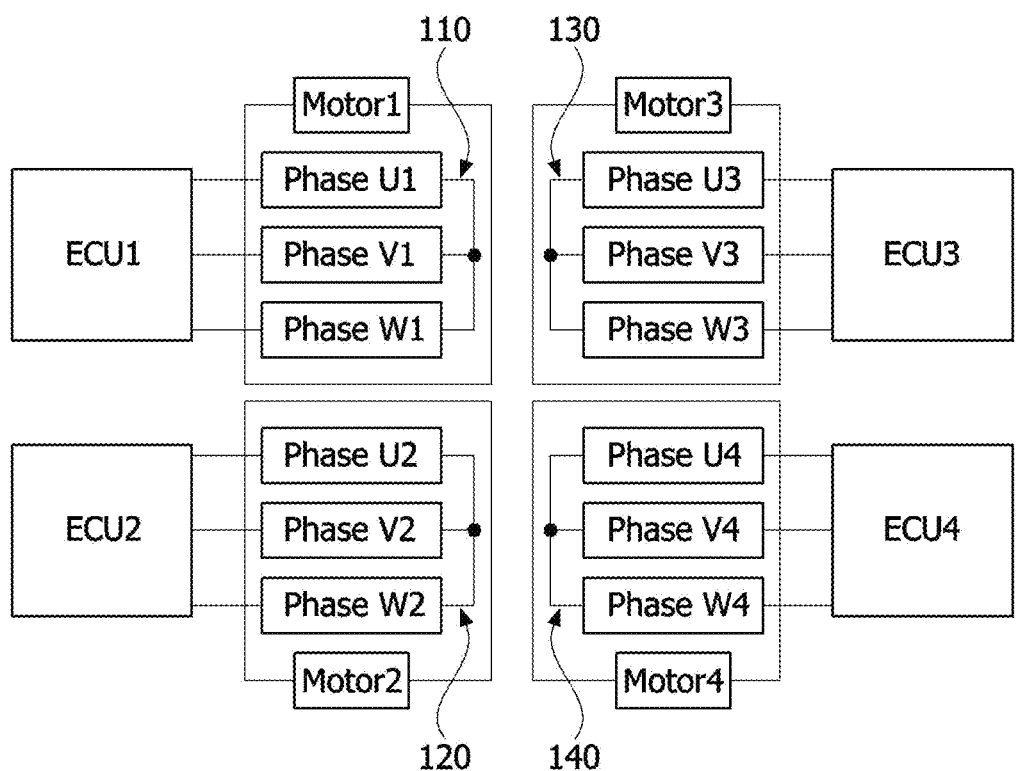
FIG. 24 is a view for describing a circuit configuration of the terminal groups in the motor according to the third embodiment.

Referring to FIG. 18, the third terminal group 130 includes the first terminal 132 (for example, a U3-phase), the second terminal 134 (for example, a V3-phase), the third terminal 136 (for example, a W3-phase), in which the terminal parts 101b, 102b, and 103b are disposed at intervals of 120 degrees about the center C1 of the stator 30, and a neutral terminal. That is, the third terminal group 130 includes the first terminal 132 (for example, the U3-phase), the second terminal 134 (for example, the V3-phase), the third terminal 136 (for example, the W3-phase), and the neutral terminal. In addition, the terminal part 101b of the first terminal 132, the terminal part 102b of the second terminal 134, and the terminal part 103b of the third terminal 136 may be disposed at intervals of 120 degrees in the circumferential direction.

For reference, in the embodiment, the meaning of arranging the terminal parts 101b, 102b, and 103b of the first terminals 112, 122, and 132, the second terminals 114, 124, and 134, and the third terminals 116, 126, and 136 of the terminal groups 110, 120, and 130 at the intervals of 120 degrees is defined that the terminal parts 101b, 102b, and 103b of the first terminals 112, 122, and 132, the second terminals 114, 124, and 134, and the third terminals 116, 126, and 136 are disposed at intervals of 120 degrees about a center of the stator 30 (of a center of the busbar).

As the terminal part 101b of the first terminal 122 of the second terminal group 120 is disposed between the terminal part 101b of the first terminal 112 of the first terminal group 110 and the terminal part 101b of the first terminal 132 of the third terminal group 130, the terminal part 102b of the second terminal 124 of the second terminal group 120 may be disposed between the terminal part 102b of the second terminal 114 of the first terminal group 110 and the terminal part 102b of the second terminal 134 of the third terminal group 130, and the terminal part 103b of the third terminal 126 of the second terminal group 120 may be disposed between the terminal part 103b of the third terminal 116 of the first terminal group 110 and the terminal part 103b of the third terminal 136 of the third terminal group 130.

As an example, the terminal part 101b of the first terminal 112 of the first terminal group 110 may be disposed in a 12 o'clock direction. In addition, the terminal part 101b of the first terminal 122 of the second terminal group 120 may be disposed between the terminal part 101b of the first terminal 132 of the third terminal group 130 disposed to be spaced at 80 degrees from the terminal part 101b of the first terminal 112 of the first terminal group 110 in a clockwise direction about the center C1 of the stator 30 and the terminal part 101b of the first terminal 112 of the first terminal group 110.

Accordingly, in the embodiment, since the terminal part 101b of the first terminal 122 of the second terminal group 120 is disposed between the terminal part 101b of the first terminal 112 of the first terminal group 110 and the terminal part 101b of the first terminal 132 of the third terminal group 130, the terminal parts 101b, 102b, and 103b of the plurality of terminal groups 110, 120, and 130 may be symmetrically disposed with respect to the center C1 of the stator 30, and thus a current may be symmetrically supplied through the plurality of terminal groups 110, 120, and 130 with respect to the center C1 of the stator 30.

In addition, protruding portions 101c, 102c, and 103c of the first to third terminals 112, 114, and 116 of the first terminal group 110 are disposed in a first region R1 of the busbar holder 42, protruding portions 101c, 102c, and 103c of the first to third terminals 122, 124, and 126 of the second terminal group 120 are disposed in a second region R2 of the busbar holder 42, protruding portions 101c, 102c, and 103c of the first to third terminals 132, 134, and 136 of the third terminal group 130 are disposed in a third region R3 of the busbar holder 42, an angular distance (for example, 40 degrees) between the first region R1 and the second region R2 is the same as an angular distance (for example, 40 degrees) between the second region R2 and the third region R3.

Figure 15:
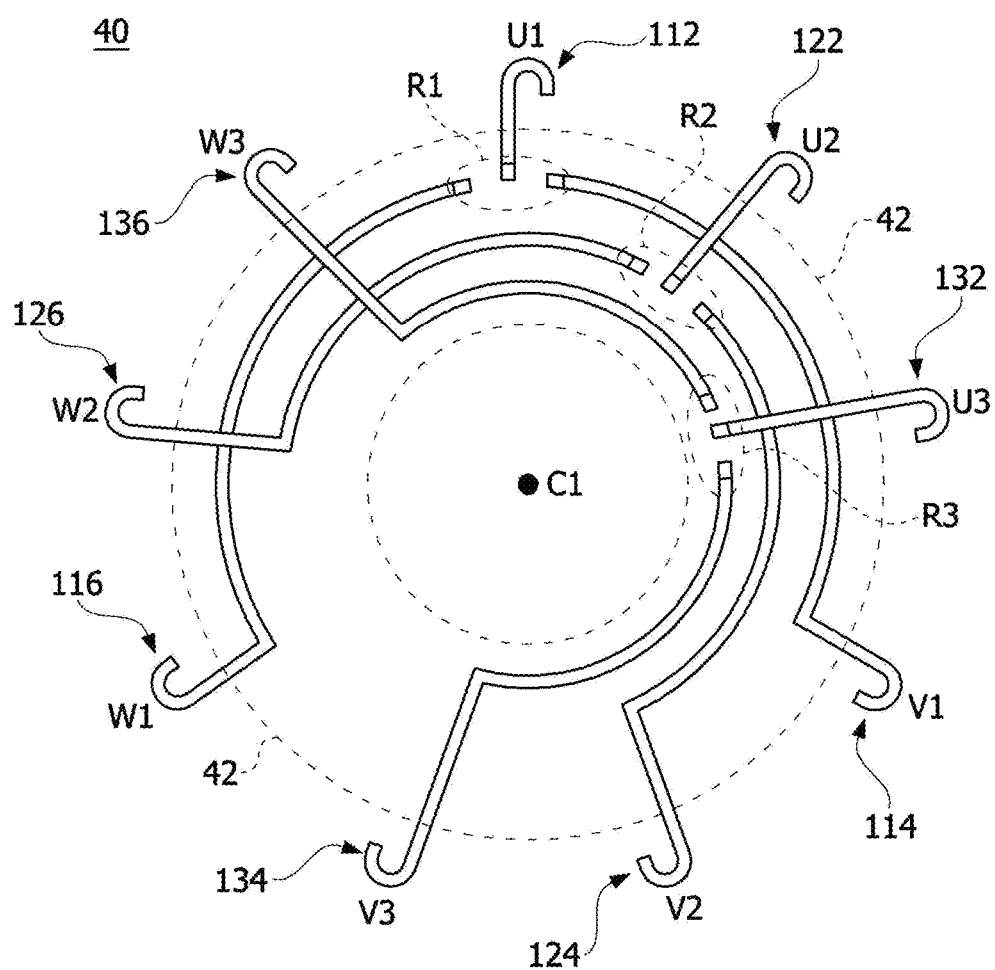
FIG. 15 is a plan view for describing a busbar in a motor according to a second embodiment.

As an example, the protruding portions 101c, 102c, and 103c of the first to third terminals 112, 114, and 116 of the first terminal group 110 may be disposed in the first region R1 of the busbar holder 42 defined in the 12 o'clock direction (in FIG. 15). In addition, the protruding portions 101c, 102c, and 103c of the first to third terminals 122, 124, and 126 of the second terminal group 120 may be disposed in the second region R2 of the busbar holder 42 defined to be spaced at 40 degrees from the first region R1 in the clockwise direction about the center C1 of the stator 30. In addition, the protruding portions 101c, 102c, and 103c of the first to third terminals 132, 134, and 136 of the third terminal group 130 may be disposed in the third region R3 of the busbar holder 42 defined to be spaced at 40 degrees from the second region R2 in the clockwise direction about the center C1 of the stator 30.

Thus, the first region R1, the second region R2, and the third region R3 may be disposed in a first quadrant region among quadrant regions divided by an orthogonal axis (x-axis and y-axis) passing through the center (C1) of the stator 30. Accordingly, since the first region R1, the second region R2, and the third region R3 are disposed to be collected in the first quadrant region, advantageous effects of simplifying a process of connecting the terminal groups 110, 120, and 130 and external power cables and improving workability and convenience can be obtained.

According to another embodiment, a first region R1, a second region R2, and a third region R3 may also be disposed in a second quadrant region, third quadrant region, or fourth quadrant region among quadrant regions divided by an orthogonal axis (x-axis and y-axis) passing through a center C1 of a stator 30.

FIGS. 19 to 24 are views for describing a motor according to a third embodiment, and FIGS. 25 to 31 are view for describing a motor according to a fourth embodiment of the present invention. In addition, components that are the same as or correspond to the above-described components will be denoted by the same reference numerals, and redundant descriptions will be omitted.

Referring to FIGS. 19 to 24, the motor according to the third embodiment may include a stator 30 and a busbar 40 disposed on the stator 30. In addition, the busbar 40 may include a busbar holder 42 and a first terminal group 110, a second terminal group 120, a third terminal group 130, and a fourth terminal group 140 which are coupled to the busbar holder 42. In addition, the first terminal group 110, the second terminal group 120, the third terminal group 130, and the fourth terminal group 140 may include first to third terminals 112, 114, 116, 118, 122, 124, 126, 128, 132, 134, 136, 138, 142, 144, 146, and 148 including terminal parts 101b, 102b, 103b, and 104b.

The first terminal group 110, the second terminal group 120, the third terminal group 130, and the fourth terminal group 140 may be circuit-divided from each other. In addition, the first terminal group 110, the second terminal group 120, the third terminal group 130, and the fourth terminal group 140 may include the plurality of terminals 112, 114, 116, 118, 122, 124, 126, 128, 132, 134, 136, 138, 142, 144, 146, and 148 including the terminal parts 101b, 102b, 103b, and 104b.

More specifically, the first terminal group 110 includes three phase terminals 112, 114, and 116 and one neutral terminal 118, the second terminal group 120 includes three phase terminals 122, 124, and 126 and one neutral terminal 128, and the third terminal group 130 includes three phase terminals 132, 134, and 136 and one neutral terminal 138, and the fourth terminal group 140 includes three phase terminals 142, 144, and 146 and one neutral terminal 148.

Figure 26:
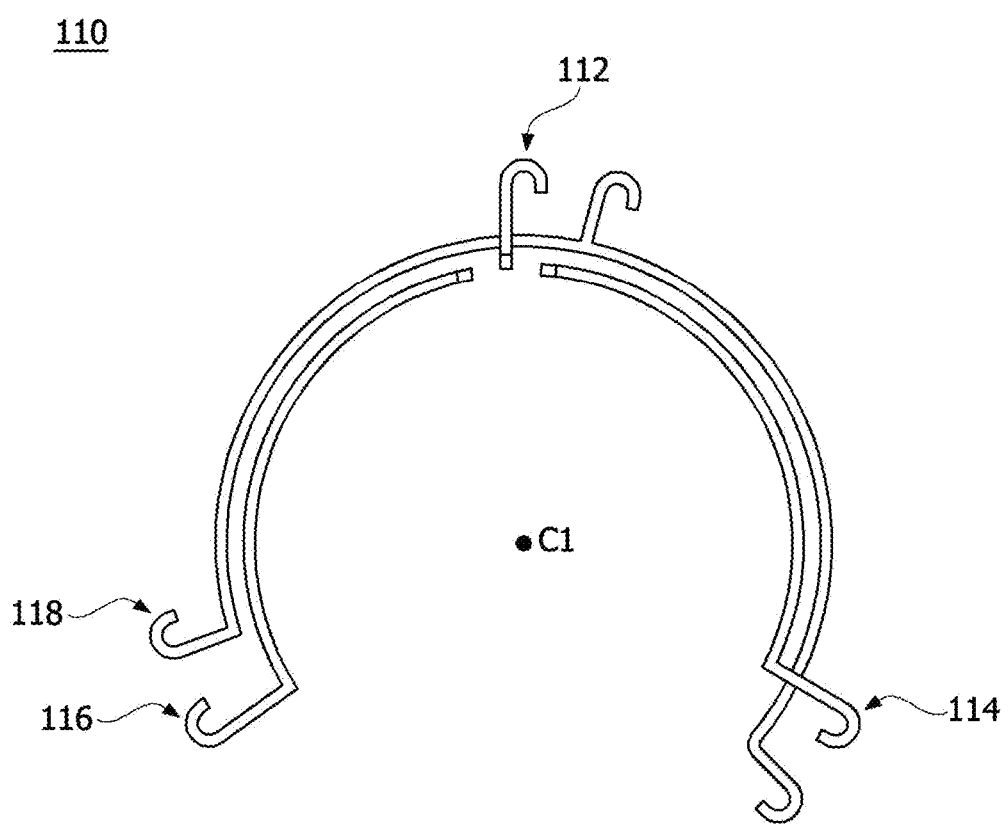
FIG. 26 is a plan view for describing a first terminal group in the motor according to the fourth embodiment.

Referring to FIG. 26, a first terminal group 110 includes a first terminal 112 (for example, a U1-phase), a second terminal 114 (for example, a V1-phase), a third terminal 116 (for example, a W1-phase), in which terminal parts 101b, 102b, and 103b are disposed at intervals of 120 degrees about a center C1 of a stator 30, and a neutral terminal 118.

Figure 27:
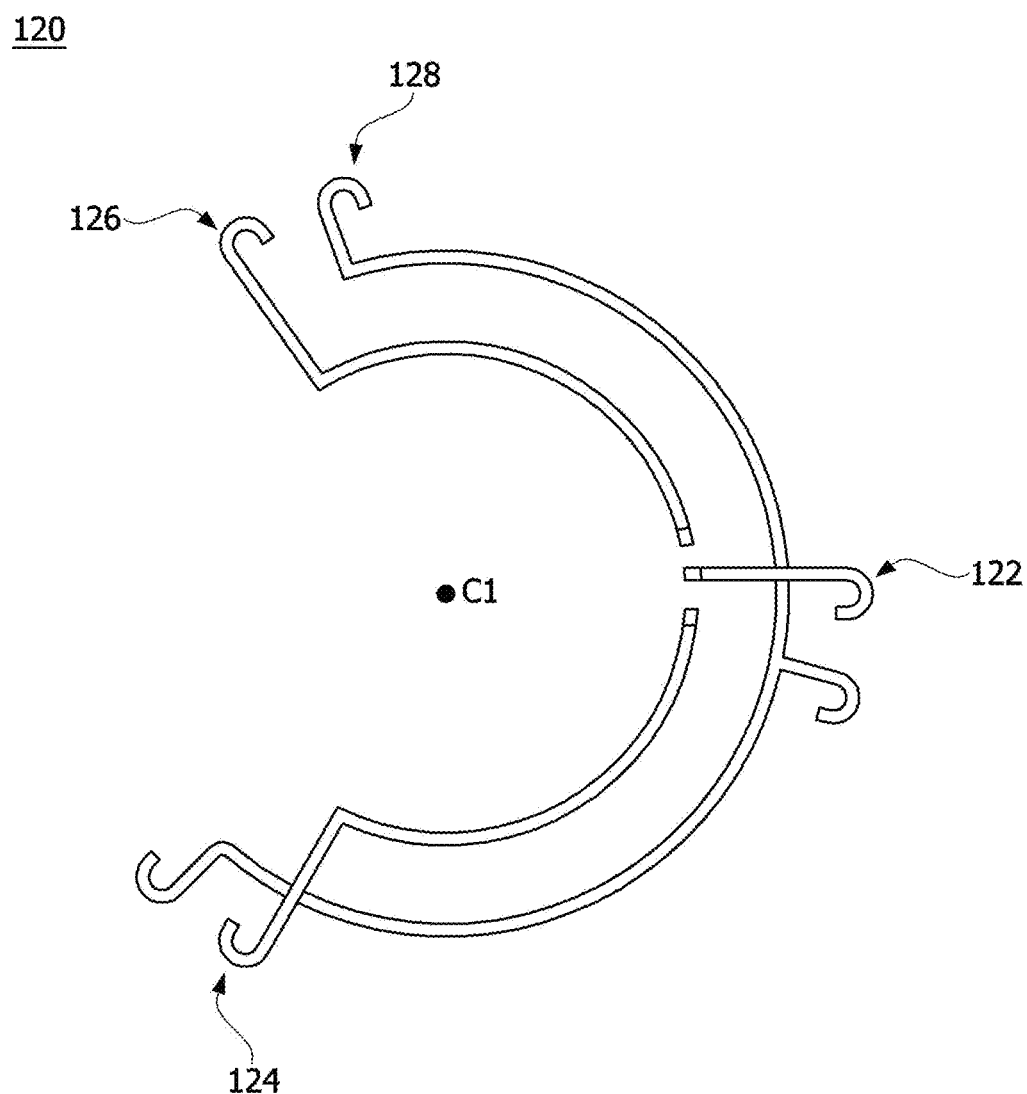
FIG. 27 is a plan view for describing a second terminal group in the motor according to the fourth embodiment.

Referring to FIG. 27, a second terminal group 120 includes a first terminal 122 (for example, a U2-phase), a second terminal 124 (for example, a V2-phase), a third terminal 126 (for example, a W2-phase), in which terminal parts 101b, 102b, and 103b are disposed at intervals of 120 degrees about the center C1 of the stator 30, and a neutral terminal 128.

Figure 28:
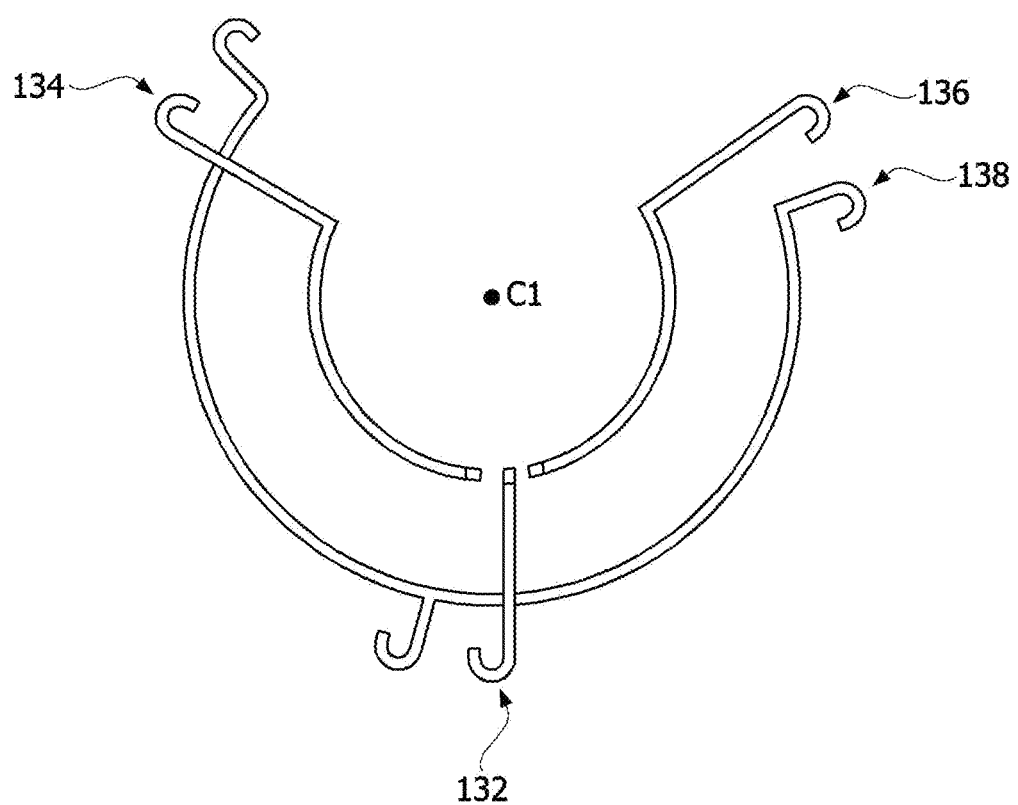
FIG. 28 is a plan view for describing a third terminal group in the motor according to the fourth embodiment.

Referring to FIG. 28, a third terminal group 130 includes a first terminal 132 (for example, a U3-phase), a second terminal 134 (for example, a V3-phase), a third terminal 136 (for example, a W3-phase), in which terminal parts 101b, 102b, and 103b are disposed at intervals of 120 degrees about the center C1 of the stator 30, and a neutral terminal 138.

Figure 29:
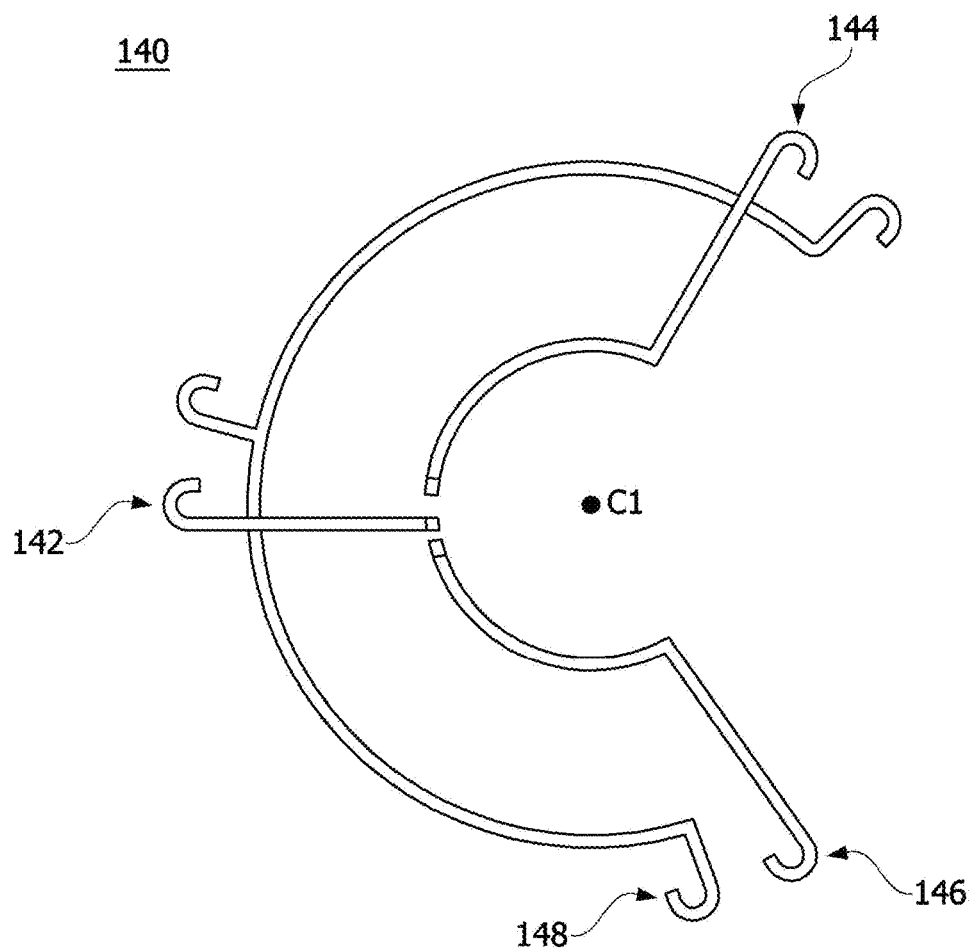
FIG. 29 is a plan view for describing a fourth terminal group in the motor according to the fourth embodiment.

Referring to FIG. 29, a fourth terminal group 140 includes a first terminal 142 (for example, a U4-phase), a second terminal 144 (for example, a V4-phase), a third terminal 146 (for example, a W4-phase), in which terminal parts 101b, 102b, and 103b are disposed at intervals of 120 degrees about the center C1 of the stator 30, and a neutral terminal 148.

For reference, in the embodiment, the meaning of arranging the terminal parts 101b, 102b, and 103b of the first terminals 112, 122, 132, and 142, the second terminals 114, 124, 134, and 144, the third terminals 116, 126, 136, and 146 of the terminal groups 110, 120, 130, and 140 at intervals of 120 degrees is defined that the terminal parts 101b, 102b, and 103b of the first terminals 112, 122, 132, and 142, the second terminals 114, 124, 134, and 144, and the third terminals 116, 126, 136, and 146 are disposed at intervals of 120 degrees about a center of the stator 30 (or a center of a busbar).

The first terminals 112, 122, and 132, the second terminals 114, 124, and 134, and the third terminals 116, 126, and 136 of the first terminal group 110 to third terminal group 130 include bodies 101a, 102a, and 103a, the terminal parts 101b, 102b, and 103b extending from one sides of the bodies 101a, 102a, and 103a, and protruding portions 101c, 102c, and 103c extending from the other sides of the bodies 101a, 102a, and 103a (see FIGS. 3 to 5).

Each of the neutral terminals 118, 128, and 138 of the first terminal group 110 to third terminal group 130 includes a body 104a and three terminal parts 104b extending from one side of the body 104a (see FIG. 6).

In addition, referring to FIG. 29, the first terminal 142, the second terminal 144, and the third terminal 146 of the fourth terminal group 140 includes bodies 101a, 102a, and 103a, the terminal parts 101b, 102b, and 103b extending from one sides of the bodies 101a, 102a, and 103a and protruding portions 101c, 102c, and 103c protruding from the other sides of the bodies 101a, 102a, and 103a.

The bodies 101a, 102a, and 103a of the terminals 142, 144, and 146 of the fourth terminal group 140 may each be formed as a straight band type member or a band type member having a curved surface. The bodies 101a, 102a, and 103a, the terminal parts 101b, 102b, and 103b, and the protruding portions 101c, 102c, and 103c may be divided and described only according to shapes and functional features thereof and may be one integrally connected member.

For example, the body 101a of the first terminal 142 of the fourth terminal group 140 may be formed as the straight band type member. However, the bodies 102a and 103a of the second terminal 144 and the third terminal 146 of the fourth terminal group 140 may each be formed as a band type member having an arc shape with a predetermined curvature.

The terminal parts 101b, 102b, and 103b of the terminals 142, 144, and 146 of the fourth terminal group 140 extend from side surfaces (outer side surfaces or inner side surfaces) of the bodies 101a in a radial direction of the stator 30 to protrude from an outer side surface (or inner side surface) of a busbar holder 42, and end portions of the terminal parts 101b, 102b, and 103b of the terminals 142, 144, and 146 of the fourth terminal group 140 are each formed in a bent shape such as a hook.

The terminal parts 101b, 102b, and 103b of the terminals 142, 144, and 146 of the fourth terminal group 140 are electrically connected to coils 31 of the stator 30. As an example, the terminal parts 101b, 102b, and 103b of the terminals 142, 144, and 146 of the fourth terminal group 140 may be fused to the coils 31 of the stator 30.

The protruding portions 101c, 102c, and 103c of the terminals 142, 144, and 146 of the fourth terminal group 140 may be disposed to extend from upper surfaces of the bodies in a vertical direction and to protrude from an upper surface of the busbar holder 42. The protruding portions 101c, 102c, and 103c of the terminals 142, 144, and 146 of the fourth terminal group 140 are connected to corresponding external power cables of U-phases, V-phases, and W-phases.

The neutral terminal 148 of the fourth terminal group 140 includes the body 104a and three terminal parts 104b extending from one side of the body 104a. As an example, the body 104a of the neutral terminal 148 of the fourth terminal group 140 may be formed as a band type member having an arc shape with a predetermined curvature.

The terminal parts 104b of the neutral terminal 148 of the fourth terminal group 140 may extend from a side surface (outer side surface or inner side surface) of the body 104a of the neutral terminal in the radial direction of the stator 30 and protrude from the outer side surface (or inner side surface) of the busbar holder 42. In this case, end portions of the terminal parts 104b of the neutral terminal 148 of the fourth terminal group 140 may each be formed in a bent shape such as a hook.

The terminal part 104b of the neutral terminal 148 of the fourth terminal group 140 is electrically connected to the coil 31 of the stator 30. As an example, the terminal part 104b of the neutral terminal 148 of the fourth terminal group 140 may be fused to the coil 31 of the stator 30.

According to the exemplary embodiment, the protruding portions 101c, 102c, and 103c of the first to third terminals 112, 114, and 116 of the first terminal group 110 may be disposed in a first region R1 of the busbar holder 42, the protruding portions 101c, 102c, and 103c of the first to third terminals 122, 124, and 126 of the second terminal group 120 may be disposed in a second region R2 of the busbar holder 42, the protruding portions 101c, 102c, and 103c of the first to third terminals 132, 134, and 136 of the third terminal group 130 may be disposed in a third region R3 of the busbar holder 42, and the protruding portions 101c, 102c, and 103c of the first to third terminals 142, 144, and 146 of the fourth terminal group 140 may be disposed in a fourth region R4 of the busbar holder 42. In this case, intervals between the first region R1 to the fourth region R4 may be the same.

Figure 25:
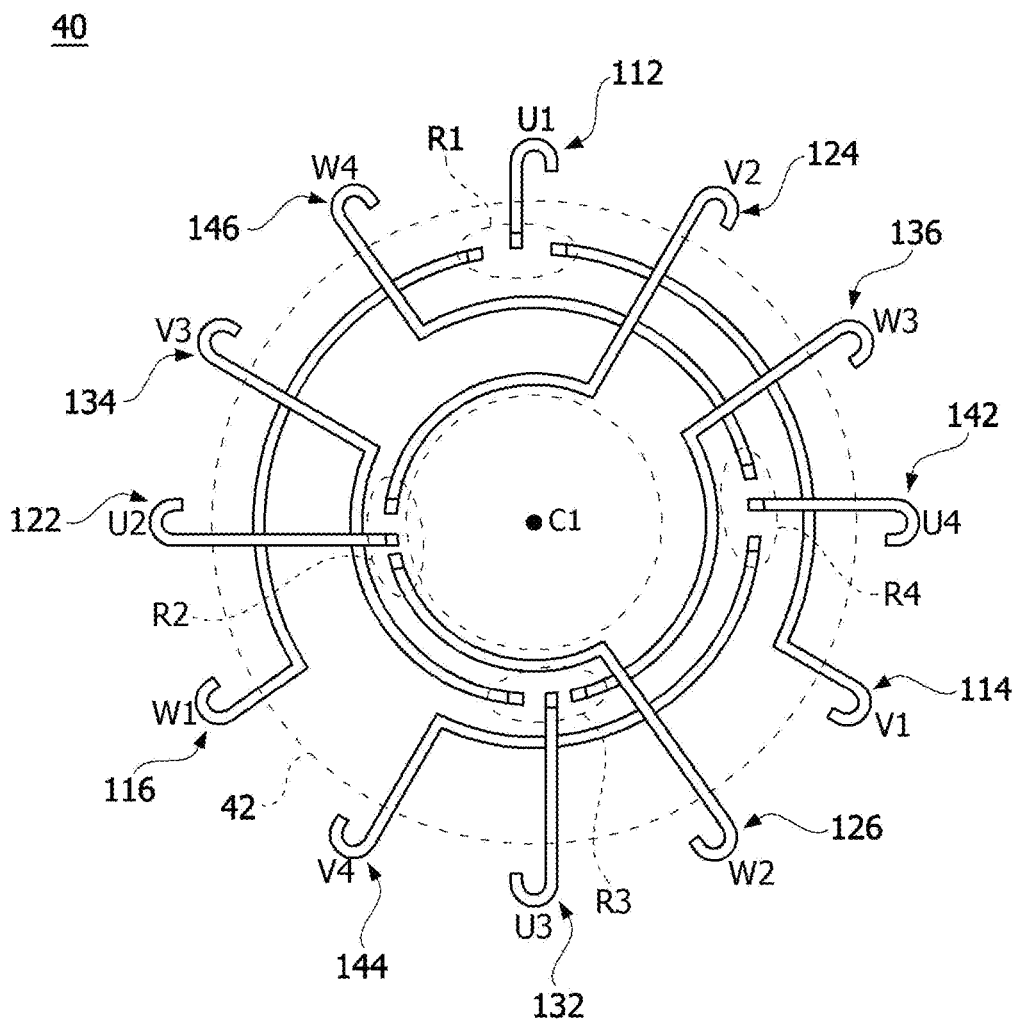
FIG. 25 is a plan view for describing a busbar in a motor according to a fourth embodiment.

As an example, referring to FIG. 25, the protruding portions 101c, 102c, and 103c of the first to third terminals 112, 114, and 116 of the first terminal group 110 may be disposed in the first region R1 of the busbar holder 42 defined in a 12 o'clock direction (in FIG. 25). In addition, the protruding portions 101c, 102c, and 103c of the first to third terminals 122, 124, and 126 of the second terminal group 120 may be disposed in the second region R2 of the busbar holder 42 defined to be spaced at 90 degrees from the first region R1 in a counter-clockwise direction about the center C1 of the stator 30. In addition, the protruding portions 101c, 102c, and 103c of the first to third terminals 132, 134, and 136 of the third terminal group 130 may be disposed in the third region R3 of the busbar holder 42 defined to be spaced at 90 degrees from the second region R2 in the counter-clockwise direction about the center C1 of the stator 30. In addition, the protruding portions 101c, 102c, and 103c of the first to third terminals 142, 144, and 146 of the fourth terminal group 140 may be disposed in the fourth region R4 of the busbar holder 42 defined to be spaced at 90 degrees from the third region R3 in the counter-clockwise direction about the center C1 of the stator 30.

Accordingly, since intervals between the first region R1, second region R2, third region R3, and the fourth region R4 are the same, the terminal parts 101b, 102b, and 103b of the plurality of terminal groups 110, 120, 130, and 140 may be symmetrically disposed with respect to the center C1 of the stator 30.

A layout of the terminal parts 101b, 102b, and 103b of the terminal groups 110, 120, 130, and 140 may be variously changed according to required conditions and design specifications.

For example, referring to FIG. 25, the terminal part 101b, 102b, or 103b of one terminal of the second terminal 134 or the third terminal 136 of the third terminal group 130 and the terminal part 101b, 102b, or 103b of one terminal of the second terminal 144 or the third terminal 146 of the fourth terminal group 140 may be disposed between the terminal part 101b of the first terminal 112 of the first terminal group 110 and the terminal part 101b of the first terminal 122 of the second terminal group 120.

As an example, the terminal part 101b of the first terminal 112 of the first terminal group 110 may be disposed in the 12 o'clock direction. In addition, the terminal part 102b of the second terminal 134 of the third terminal group 130 and the terminal part 103b of the third terminal 146 of the fourth terminal group 140 may be disposed between the terminal part 101b of the first terminal 122 of the second terminal group 120 disposed at 90 degrees from the terminal part 101b of the first terminal 112 of the first terminal group 110 in the counter-clockwise direction about the center C1 of the stator 30 and the terminal part 101b of the first terminal 112 of the first terminal group 110.

Accordingly, in the embodiment, since the terminal part 102b or 103b of one terminal of the second terminal 134 or the third terminal 136 of the third terminal group 130 and the terminal part 102b or 103b of one terminal of the second terminal 144 or the third terminal 146 of the terminal fourth terminal group 140 are disposed between the terminal part 101b of the first terminal 112 of the first terminal group 110 and the terminal part 101b of the first terminal 122 of the second terminal group 120, the terminal parts 101b, 102b, and 103b of the plurality of terminal groups 110, 120, 130, and 140 may be symmetrically disposed with respect to the center C1 of the stator 30. Accordingly, a current may be symmetrically supplied through the plurality of terminal groups 110, 120, 130, and 140 with respect to the center C1 of the stator 30

Figure 32:
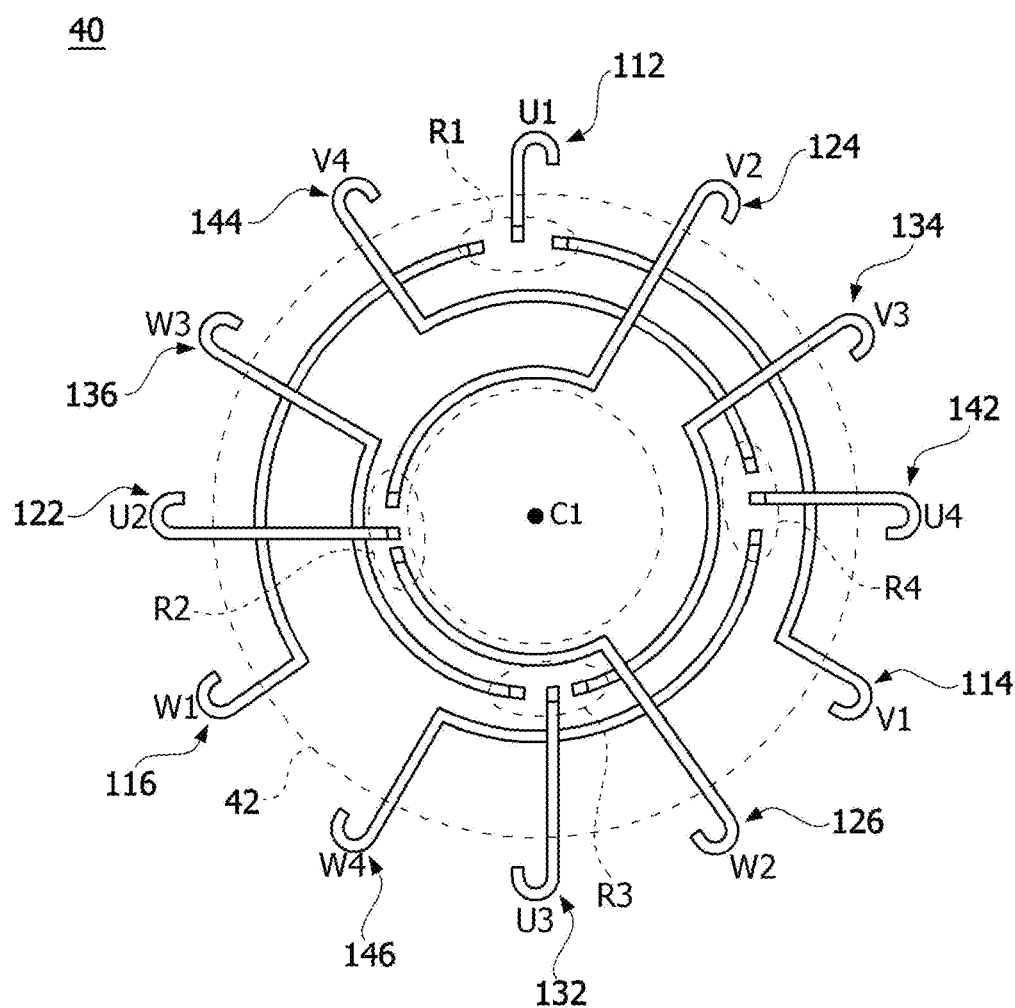
FIG. 32 is a plan view for describing a busbar in a motor according to a fifth embodiment.

In the above-described and illustrated embodiment, an example of the terminal part 102b of the second terminal 134 of the third terminal group 130 and the terminal part 103b of the third terminal 146 of the fourth terminal group 140 which are disposed between the terminal part 101b of the first terminal 112 of the first terminal group 110 and the terminal part 101b of the first terminal 122 of the second terminal group 120, but the present invention is not necessarily limit thereto. For example, as in FIG. 32, a terminal part 103b of a third terminal 136 of a third terminal group 130 and a terminal part 102b of a second terminal 144 of a fourth terminal group 140 may also be disposed between a terminal part 101b of a first terminal 112 of a first terminal group 110 and a terminal part 101b of a first terminal 122 of a second terminal group 120.

Figure 33:
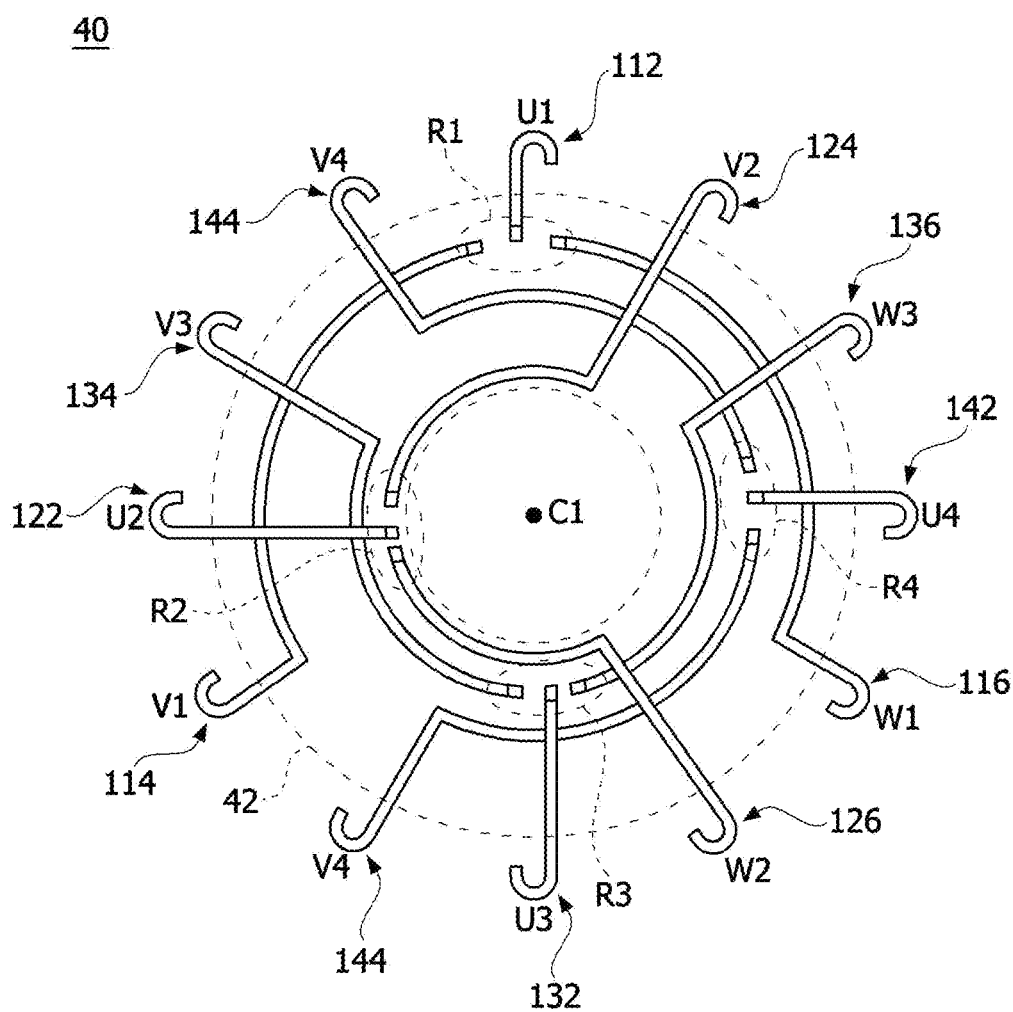
FIG. 33 is a plan view for describing a busbar in a motor according to a sixth embodiment.

Alternatively, as in FIG. 33, a terminal part 102b of a second terminal 134 of a third terminal group 130 and a terminal part 102b of a second terminal 144 of a fourth terminal group 140 may also be disposed between a terminal part 101b of a first terminal 112 of a first terminal group 110 and a terminal part 101b of a first terminal 122 of a second terminal group 120

Figure 30:
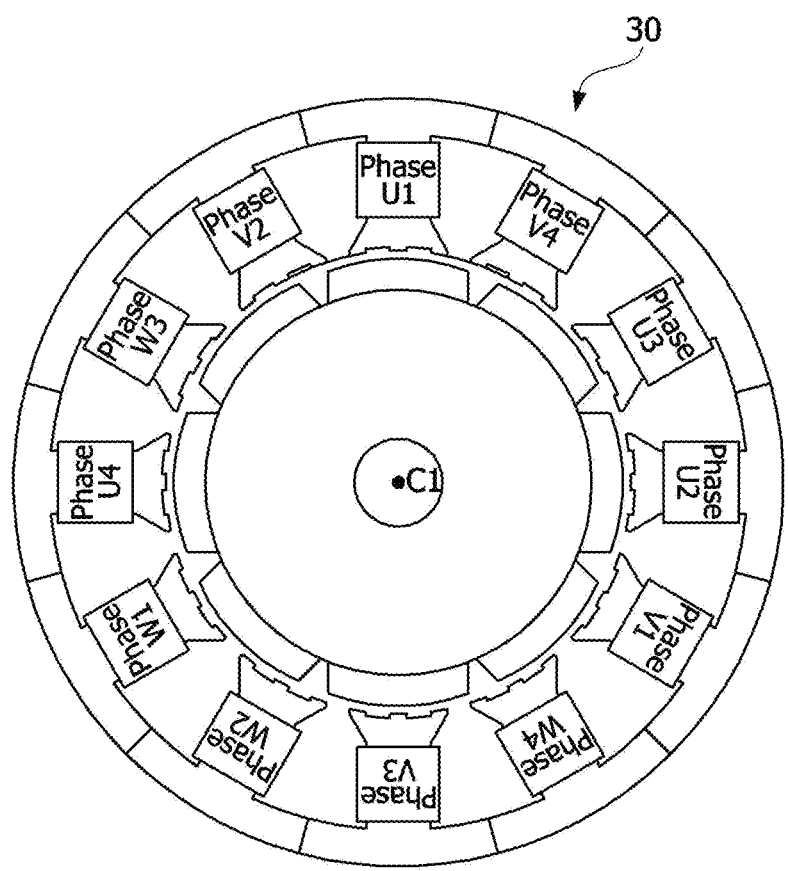
FIG. 30 is a view for describing a winding structure of a coil in the motor according to the fourth embodiment.

Still alternatively, as in FIG. 30, the terminal part 102b of the second terminal (144) of the fourth terminal group 140 and the terminal part 101b of the first terminal (132) of the third terminal group 130 may also be disposed between the terminal part 101b of the first terminal 112 of the first terminal group 110 and the terminal part 101b of the first terminal 122 of the second terminal group 120 to apply power of a V-phase V4 of the fourth terminal group 140 and power of a W-phase W3 of the third terminal group 130.

Figure 34:
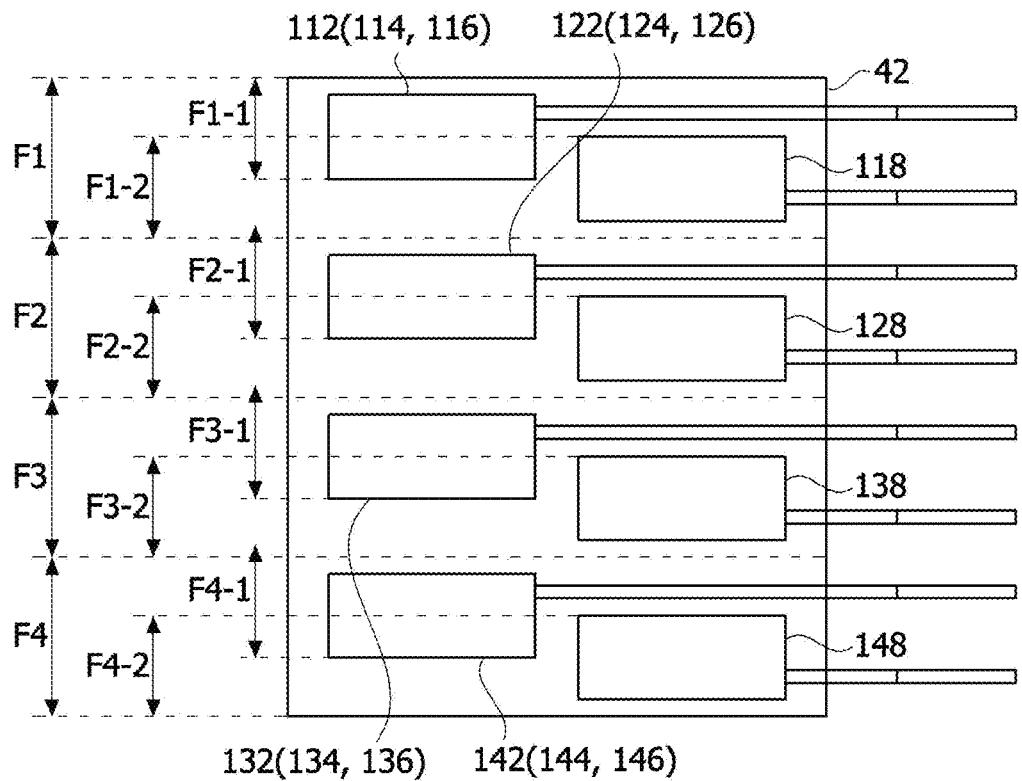
FIG. 34 is a view for describing a stack structure of a terminal group in a motor according to an embodiment.

Meanwhile, referring to FIG. 34, a first terminal group 110, a second terminal group 120, a third terminal group 130, a fourth terminal group 140 may be disposed to form different layers in an axial direction of a shaft 10.

This is to arrange terminal parts 101b, 102b, 103b, and 104b of the plurality of the terminal groups 110, 120, 130, and 140 not to overlap in the axial direction of the shaft 10.

That is, when the plurality of terminal groups 110, 120, 130, and 140 are disposed on a single layer, since phase terminals and neutral terminals constituting the terminal groups should have different structures and sizes (for example, different curvatures), it is difficult to commonly use only one type of terminal group to manufacture a terminal unit 100 including the plurality of terminal groups 110, 120, 130, and 140 which are circuit-divided, and the plurality of terminal groups 110, 120, 130, and 140 should be individually manufactured.

However, in the embodiment, since the plurality of terminal groups 110, 120, 130, and 140 are disposed on different layers, only one type of terminal group may be commonly used to manufacture the terminal unit 100 including the plurality of terminal groups 110, 120, 130, and 140 which are circuit-divided, and the terminal parts 101b, 102b, 103b, and 104b of the terminal groups 110, 120, 130, and 140 may be disposed not to overlap in the axial direction of the shaft 10.

According to the exemplary embodiment, the first terminal group 110 is disposed to form a first layer F1, the second terminal group 120 is disposed to form a second layer F2 under the first terminal group 110, the third terminal group 130 is disposed to form a third layer F3 under the second terminal group 120, and the fourth terminal group 140 is disposed to form a fourth layer F4 under the third terminal group 130.

For reference, in the embodiment, an example of the first terminal group 110 disposed on the first layer positioned at an uppermost portion and the fourth terminal group 140 disposed on the fourth layer F4 disposed at a lowermost portion has been described, but the fourth terminal group 140 may also be disposed on the first layer, and the first terminal group 110 may also be disposed on the fourth layer.

Preferably, the first layer F1 may include a first upper layer F1-1 in which a plurality of first phase terminals are disposed and a first lower layer F1-2 which is positioned under the first upper layer F1-1 and in which a first neutral terminal 118 is disposed.

As an example, a lower section of the first upper layer F1-1 and an upper section of the first lower layer F1-2 may be disposed to overlap each other in a radial direction. Since the lower section of the first upper layer F1-1 and the upper section of the first lower layer F1-2 overlap each other, a total height of the busbar 40 may be reduced, and thus the motor can be further miniaturized. According to another embodiment, a first upper layer and a first lower layer may also not overlap and may be completely separated from each other.

Similarly to the first layer F1, the second layer F2 may include a second upper layer F2-1 in which a plurality of second phase terminals are disposed and a second lower layer F2-2 which is positioned under the second upper layer F2-1 and a second neutral terminal 128 is disposed. In addition, the third layer F3 may include a third upper layer F3-1 in which a plurality of third phase terminals are disposed and a third lower layer F3-2 which is positioned under the third upper layer F3-1 and in which a third neutral terminal 138 is disposed. In addition, the fourth layer F4 may include a fourth upper layer F4-1 in which a plurality of fourth phase terminals are disposed and a fourth lower layer F4-2 which is positioned under the fourth upper layer F4-1 and in which a fourth neutral terminal 148 is disposed.

In addition, in a structure in which the first terminal group 110, the second terminal group 120, the third terminal group 130, and the fourth terminal group 140 are stacked to form the different layers, a busbar holder 42 constituting the busbar 40 may be formed to surround an entirety of the first terminal group 110, the second terminal group 120, the third terminal group 130, and the fourth terminal group 140.

In the above-described and illustrated embodiment, an example of the plurality of terminal groups 110, 120, 130, and 140 connected by only one busbar holder 42 has been described, but the present invention is not necessarily limited thereto. For example, according to another embodiment, there is also a configuration in which a plurality of terminal groups are connected using different busbar holders.

Figure 35:
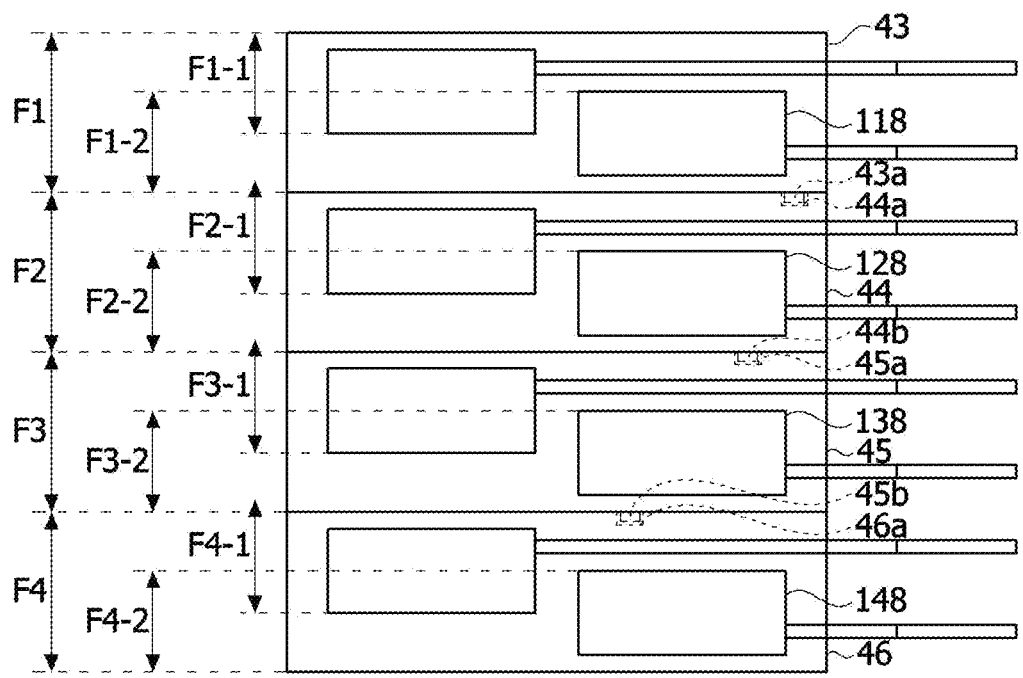
FIG. 35 is a view for describing a first busbar holder to a fourth busbar holder in a motor according to an embodiment.

Referring to FIG. 35, a motor according to another embodiment includes a first busbar holder 43 formed to surround a first terminal group 110, a second busbar holder 44 formed to surround a second terminal group 120, a third busbar holder 45 formed to surround a third terminal group 130, and a fourth busbar holder 46 formed to surround a fourth terminal group 140.

The first busbar holder 43 to fourth busbar holder 46 may be sequentially stacked to constitute a busbar 40.

Preferably, a first protrusion 43a may be formed on a lower portion of the first busbar holder 43, a first groove 44a into which the first protrusion 43a is inserted may be formed in an upper portion of the second busbar holder 44, a second protrusion 44b may be formed on a lower portion of the second busbar holder 44 to be disposed at a different position from the first protrusion 43a, a second groove 45a into which the second protrusion 44b is inserted may be formed on an upper portion of the third busbar holder 45, a third protrusion 45b may be formed on a lower portion of the third busbar holder 45 to be disposed at a different position from the second protrusion 44b, and a third groove 46a into which the third protrusion 45b is inserted may be formed in an upper portion of the fourth busbar holder 46.

In this case, the meaning of arranging the second protrusion 44b at the different position from the first protrusion 43a is defined that the second protrusion 44b and the first protrusion 43a are disposed not to overlap each other in an axial direction of a shaft 10. Similarly, the meaning of arranging the third protrusion 45b at the different position from the second protrusion 44b is defined that the third protrusion 45b and the second protrusion 44b are disposed not to overlap in the axial direction of the shaft 10.

The first protrusion 43a to the third protrusion 45b and the first groove 44a to the third groove 46a are provided to guide assembly positions and inhibit misassembly when the first busbar holder 43 to the fourth busbar holder 46 are assembled.

Only in a condition in which the plurality of busbar holders 43, 44, 45, and 46 are disposed at regular positions, the protrusions may be inserted into the corresponding grooves.

That is, only when the third busbar holder 45 is disposed on the fourth busbar holder 46, the third protrusion 45b may be accommodated in the third groove 46a, and when the second busbar holder 44 is disposed on the fourth busbar holder 46, the second protrusion 44b may not be accommodated in the third groove 46a. Similarly, only when the second busbar holder 44 is disposed on the third busbar holder 45, the second protrusion 44b may be accommodated in the second groove 45a, and only when the first busbar holder 43 is disposed on the second busbar holder 44, the first protrusion 43a may be accommodated in the first groove 44a.

Accordingly, since the protrusions are inserted into the corresponding grooves only when the plurality of busbar holders 43, 44, 45, and 46 are disposed at the regular positions, advantageous effect of inhibiting misassemble of the first busbar holder 43 to the fourth busbar holder 46 and improving assemblability of the first busbar holder 43 to the fourth busbar holder 46 can be obtained.

While the present invention has been described above with reference to exemplary embodiments, it may be understood by those skilled in the art that various modifications and changes of the present invention may be made within a range not departing from the spirit and scope of the present invention defined by the appended claims.

REFERENCE NUMERALS

10: SHAFT
20: ROTOR
30: STATOR
31: COIL
40: BUSBAR
42: BUSBAR HOLDER
50: HOUSING
101A,102A,103A,104A: BODY
101B,102B,103B,104B: TERMINAL PART
101C,102C,103C: PROTRUDING PORTION
110: FIRST TERMINAL GROUP
120: SECOND TERMINAL GROUP
130: THIRD TERMINAL GROUP
140: FOURTH TERMINAL GROUP
112,122,132,142: FIRST TERMINAL
114,124,134,144: SECOND TERMINAL
116,126,136,146: THIRD TERMINAL
118,128,138,148: NEUTRAL TERMINAL

The invention claimed is:

1. A motor comprising:
a stator; and
a busbar disposed on the stator,
wherein the busbar includes a busbar holder and a first terminal group, a second terminal group, and a third terminal group that are coupled to the busbar holder,
wherein the first terminal group, the second terminal group, and the third terminal group are circuit-separated,
wherein each of the first terminal group, the second terminal group, and the third terminal group includes a first terminal, a second terminal, and a third terminal,
wherein in a circumferential direction, the first terminal is disposed between the second terminal and the third terminal, and
wherein:
the first terminal group, the second terminal group, and the third terminal group are disposed to form different layers in an axial direction;
a first layer in which the first terminal group is disposed includes a first upper layer in which a plurality of first phase terminals are disposed and a first lower layer that is positioned under the first upper layer and in which a first neutral terminal is disposed; and
a lower section of the first upper layer and an upper section of the first lower layer are disposed to overlap in a radial direction.

2. The motor of claim 1, wherein each of the first terminal, the second terminal, and the third terminal includes a body, a terminal part disposed on one side of the body and connected to a coil of the stator, and a protruding portion disposed on another side of the body and connected to an external power source.

3. A motor comprising:
a stator; and
a busbar disposed on the stator,
wherein the busbar includes a busbar holder and a first terminal group, a second terminal group, and a third terminal group that are coupled to the busbar holder,
wherein the first terminal group, the second terminal group, and the third terminal group are circuit-separated,
wherein each of the first terminal group, the second terminal group, and the third terminal group includes a first terminal to a third terminal,
wherein each of the first terminal, the second terminal, and the third terminal includes a body, a terminal part disposed on one side of the body and connected to a coil of the stator, and a protruding portion disposed on another side of the body and connected to an external power source,
wherein a current is independently applied to each of the first terminal group to the third terminal group,
wherein in a circumferential direction, the terminal parts of the first terminal, second terminal, and third terminal are disposed at equal distances, and
wherein lengths of two bodies among the body of the first terminal, the body of the second terminal, and the body of the third terminal are the same and greater than a length of the remaining one body.

4. A motor comprising:
a stator; and
a busbar disposed on the stator,
wherein the busbar includes a busbar holder and a first terminal group, a second terminal group, and a third terminal group that are coupled to the busbar holder,
wherein the first terminal group, the second terminal group, and the third terminal group are circuit-separated,
wherein each of the first terminal group, the second terminal group, and the third terminal group includes a first terminal to a third terminal, wherein each of the first terminal, the second terminal, and the third terminal includes a body, a terminal part disposed on one side of the body and connected to a coil of the stator, and a protruding portion disposed on another side of the body and connected to an external power source, wherein the terminal part of one terminal of the first terminal to the third terminal of the second terminal group and the terminal part of one terminal of the first terminal to the third terminal of the third terminal group are disposed between the terminal part of the first terminal of the first terminal group and the terminal part of the second terminal of the first terminal group, and wherein:

the protruding portions of the first terminal to the third terminal of the first terminal group are disposed in a first region of the busbar holder;

the protruding portions of the first terminal to the third terminal of the second terminal group are disposed in a second region of the busbar holder;

the protruding portions of the first terminal to the third terminal of the third terminal group are disposed in a third region of the busbar holder; and a distance between the first region and the second region is the same as a distance between the second region and the third region.

5. The motor of claim 4, wherein:

the terminal part extends from one side of the body; and the protruding portion extends from an other side of the body.

6. The motor of claim 4, wherein a shape of at least one terminal among the first terminal, the second terminal, and the third terminal is different from shapes of the remaining terminals.

7. The motor of claim 6, wherein lengths of two bodies among the body of the first terminal, the body of the second terminal, and the body of the third terminal are the same and greater than a length of the remaining one body.

8. The motor of claim 4, wherein the distance between the first region and the second region is smaller than a distance between the first region and the third region.

* * * * *